United States Patent
Huennekes et al.

(10) Patent No.: US 12,296,322 B2
(45) Date of Patent: May 13, 2025

(54) HIGH AMMONIA STORAGE CAPACITY SCR CATALYSTS

(71) Applicant: BASF MOBILE EMISSIONS CATALYSTS LLC, Iselin, NJ (US)

(72) Inventors: Edgar Viktor Huennekes, Hannover (DE); Petra Cordes, Wunstorf (DE); Jan Martin Becker, Hannover (DE); Kevin Beard, Iselin, NJ (US); Nicholas McGuire, Huntsville, AL (US); Jaya L Lakshmi, Iselin, NJ (US); John K Hochmuth, State College, NJ (US); Joseph A Patchett, Iselin, NJ (US); Kenneth E Voss, Somerville, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 334 days.

(21) Appl. No.: 17/907,554

(22) PCT Filed: Mar. 31, 2021

(86) PCT No.: PCT/EP2021/058448
§ 371 (c)(1),
(2) Date: Sep. 28, 2022

(87) PCT Pub. No.: WO2021/198339
PCT Pub. Date: Oct. 7, 2021

(65) Prior Publication Data
US 2023/0141207 A1    May 11, 2023

(30) Foreign Application Priority Data
Apr. 1, 2020 (EP) .................................... 20167554

(51) Int. Cl.
*B01J 29/76* (2006.01)
*B01D 53/94* (2006.01)
(Continued)

(52) U.S. Cl.
CPC ...... *B01J 29/7615* (2013.01); *B01D 53/9418* (2013.01); *B01D 53/9472* (2013.01);
(Continued)

(58) Field of Classification Search
CPC ...... F01N 3/035; F01N 3/0814; F01N 3/0842; F01N 3/206; F01N 3/2066; F01N 3/208;
(Continued)

(56) References Cited

U.S. PATENT DOCUMENTS

| 2,520,365 A | 8/1950 | Hopper |
| 9,352,307 B2 | 5/2016 | Stiebels et al. |

(Continued)

FOREIGN PATENT DOCUMENTS

| WO | WO-2016/020806 A1 | 2/2016 |
| WO | WO-2020/020927 A1 | 1/2020 |

OTHER PUBLICATIONS

International Search Report dated Jul. 6, 2021, PCT/EP2021/058448.

*Primary Examiner* — Binh Q Tran
(74) *Attorney, Agent, or Firm* — DLA Piper LLP (US)

(57) ABSTRACT

The present invention relates to a catalyst for the selective catalytic reduction of nitrogen oxide, the catalyst comprising a first coating comprising a 12-membered ring pore zeolitic material comprising a first metal which is one or more of copper and iron, and a second coating comprising an 8-membered ring pore zeolitic material comprising a second metal which is one or more of copper and iron.

16 Claims, 5 Drawing Sheets

(51) Int. Cl.

| | |
|---|---|
| *B01J 21/08* | (2006.01) |
| *B01J 29/03* | (2006.01) |
| *B01J 29/035* | (2006.01) |
| *B01J 29/06* | (2006.01) |
| *B01J 29/80* | (2006.01) |
| *B01J 35/00* | (2024.01) |
| *B01J 35/56* | (2024.01) |
| *B01J 37/02* | (2006.01) |
| *B01J 37/04* | (2006.01) |
| *B01J 37/08* | (2006.01) |
| *F01N 3/035* | (2006.01) |
| *F01N 3/08* | (2006.01) |
| *F01N 3/20* | (2006.01) |
| *F01N 3/28* | (2006.01) |

(52) U.S. Cl.
CPC .............. *B01J 21/08* (2013.01); *B01J 29/80* (2013.01); *B01J 35/19* (2024.01); *B01J 35/56* (2024.01); *B01J 37/0228* (2013.01); *B01J 37/0236* (2013.01); *B01J 37/0246* (2013.01); *B01J 37/04* (2013.01); *B01J 37/088* (2013.01); *F01N 3/035* (2013.01); *F01N 3/2066* (2013.01); *F01N 3/2828* (2013.01); *B01D 53/9422* (2013.01); *B01D 2255/20738* (2013.01); *B01D 2255/20761* (2013.01); *B01D 2255/502* (2013.01); *B01D 2255/911* (2013.01); *B01D 2255/9155* (2013.01); *B01J 29/0333* (2013.01); *B01J 29/0352* (2013.01); *B01J 2029/062* (2013.01); *B01J 29/76* (2013.01); *F01N 3/0814* (2013.01); *F01N 3/0842* (2013.01); *F01N 2330/06* (2013.01); *F01N 2370/04* (2013.01)

(58) Field of Classification Search
CPC .............. F01N 3/2828; F01N 2330/06; F01N 2370/04; F01N 2510/063; F01N 2510/0684; F01N 2570/14; F01N 2570/143; B01J 21/08; B01J 29/0333; B01J 29/0352; B01J 29/72; B01J 29/76; B01J 29/7615; B01J 29/80; B01J 35/19; B01J 35/56; B01J 37/0228; B01J 37/0236; B01J 37/0246; B01J 37/04; B01J 37/088; B01J 2029/062; B01J 35/00; B01J 35/30; B01J 29/46; B01J 29/763; B01J 37/0215; B01J 37/038; B01D 53/9418; B01D 53/9422; B01D 53/9472; B01D 2255/20738; B01D 2255/20761; B01D 2255/50; B01D 2255/502; B01D 2255/504; B01D 2255/911; B01D 2255/9155; B01D 2251/2067; B01D 2258/012; Y02C 20/10; Y02T 10/12

See application file for complete search history.

(56) References Cited

U.S. PATENT DOCUMENTS

| | | | |
|---|---|---|---|
| 9,597,636 | B2 | 3/2017 | Sonntag et al. |
| 2014/0112853 | A1* | 4/2014 | Mohanan .................. B01J 29/80 502/66 |
| 2018/0214824 | A1* | 8/2018 | Dumbuya ............ B01D 53/944 |
| 2018/0229224 | A1* | 8/2018 | Zheng .................... B01J 21/066 |
| 2018/0339288 | A1* | 11/2018 | Petrovic ................ C01B 39/026 |
| 2019/0022584 | A1* | 1/2019 | Hilgendorff ....... B01D 53/9477 |
| 2019/0168199 | A1* | 6/2019 | Yang .................... B01J 37/009 |
| 2021/0180500 | A1* | 6/2021 | Huennekes ............. B01J 23/44 |

* cited by examiner

HIGH AMMONIA STORAGE CAPACITY SCR CATALYSTS

This application is a national stage filing under 35 U.S.C. § 371 of International Application No. PCT/EP2021/058448, filed on Mar. 31, 2021, and claims priority to EP Application No. 20167554.3, filed Apr. 1, 2020; the disclosure of each of these applications are incorporated herein by reference in their entirety.

The present invention relates to catalysts for the selective catalytic reduction of nitrogen oxide, processes for preparing said catalysts for the selective catalytic reduction of nitrogen oxide, use of a catalyst for the selective catalytic reduction of nitrogen oxide and an exhaust gas treatment system comprising said catalyst.

U.S. Pat. No. 9,352,307 B2 discloses a selective catalytic reduction (SCR) catalyst comprising a mixture of zeolitic material, namely a mixture of a Cu-CHA and a Fe-MFI.

Further, EP 2 520 365 A2 also discloses a catalyst for use in selective catalytic reduction comprising a first molecular sieve having large, medium or meso-pore crystal structure, optionally containing a first metal, and a second molecular sieve having a small pore crystal structure, and optionally containing a second metal. Finally, U.S. Pat. No. 9,597,636 B2 discloses a system comprising a first upstream SCR zone with a first ammonia storage capacity and a second downstream SCR zone with a second ammonia storage capacity, wherein the second ammonia storage capacity is greater than the first ammonia storage capacity.

In transient cycles, fresh urea dosing is sometimes limited such as during accelerations. Thus, there is a need to provide improved selective catalytic reduction (SCR) catalysts which permit to optimize the NOx conversion and minimize the nitrous oxide ($N_2O$) formation while the urea dosing is limited.

Surprisingly, it has been found that the selective catalytic reduction catalysts according to the present invention permit to optimize the NOx conversion and minimize the nitrous oxide ($N_2O$) formation while the urea dosing is limited.

I. A Catalyst for the Selective Catalytic Reduction of NOx

Therefore, the present invention relates to a catalyst for the selective catalytic reduction of nitrogen oxide, the catalyst comprising (i) a substrate comprising an inlet end, an outlet end, a substrate axial length extending from the inlet end to the outlet end and a plurality of passages defined by internal walls of the flow through substrate extending therethrough;

(ii) a first coating comprising a 12-membered ring pore zeolitic material comprising a first metal which is one or more of copper and iron, wherein said 12-membered ring pore zeolitic material comprises said first metal in an amount of z1 weight-%, calculated as the weight of the first metal, calculated as CuO and $Fe_2O_3$, divided by the weight of the 12-membered ring pore zeolitic material comprising the first metal;

(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal;

wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75;

wherein the second coating extends over y % of the substrate axial length from the outlet end toward the inlet end of the substrate, wherein y is in the range of from 25 to 90;

wherein the ratio z1:z2 is in the range of from 0.5:1 to 0.95:1.

It is preferred that x is in the range of from 20 to 72, more preferably in the range of from 22 to 70, more preferably in the range of from 25 to 68. Alternatively, it is preferred that x is in the range of from 10 to 18, more preferably in the range of from 10 to 15.

It is preferred that y is in the range of from 27 to 80, more preferably in the range of from 30 to 78, more preferably in the range of from 32 to 75.

It is preferred that y is 100−x.

It is preferred that the second coating is disposed on the surface of the internal walls of the substrate.

When x<y, it is preferred that x is in the range of 10 to 45, more preferably in the range of from 20 to 40, more preferably in the range of from 25 to 35. Alternatively, when x>y, it is preferred that x is in the range of from 55 to 75, more preferably in the range of from 60 to 72, more preferably in the range of from 62 to 70, more preferably in the range of from 63 to 68.

It is preferred that there is no overlap of the first coating and the second coating.

As to the first coating, it is preferred that the 12-membered ring pore zeolitic material contained in said first coating has a framework type selected from the group consisting of BEA, FAU, USY, GME, MOR, OFF, a mixture of two or more thereof and a mixed type of two or more thereof, more preferably selected from the group consisting of BEA, FAU, a mixture of two or more thereof and a mixed type of two or more thereof. It is more preferred that the 12-membered ring pore zeolitic material contained in the first coating has a framework type BEA.

Therefore, the present invention preferably relates to a catalyst for the selective catalytic reduction of nitrogen oxide, the catalyst comprising (i) a substrate comprising an inlet end, an outlet end, a substrate axial length extending from the inlet end to the outlet end and a plurality of passages defined by internal walls of the flow through substrate extending therethrough;

(ii) a first coating comprising a 12-membered ring pore zeolitic material comprising a first metal which is one or more of copper and iron, wherein said 12-membered ring pore zeolitic material comprises said first metal in an amount of z1 weight-%, calculated as the weight of the first metal, calculated as CuO and $Fe_2O_3$, divided by the weight of the 12-membered ring pore zeolitic material comprising the first metal, the 12-membered ring pore zeolitic material contained in the first coating has a framework type BEA;

(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal;

wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75; wherein the second coating extends over y % of the substrate axial length from the outlet end toward the inlet end of the substrate, wherein y is in the range of from 25 to 90; wherein the ratio z1:z2 is in the range of from 0.5:1 to 0.95:1.

In the context of the present invention, it is preferred that the 12-membered ring pore zeolitic material contained in the first coating comprises a first metal which is iron. It is more preferred that said 12-membered ring pore zeolitic material comprises iron in an amount of z1 weight-%, calculated as the weight of the first metal, calculated as $Fe_2O_3$, divided by the weight of the 12-membered ring pore zeolitic material comprising the first metal, wherein z1 more preferably is in the range of from 1.0 to 10, more preferably in the range of from 1.5 to 8, more preferably in the range of from 2 to 6, more preferably in the range of from 3 to 5, more preferably in the range of from 3.5 to 4.8.

Preferably from 0 to 0.001 weight-%, more preferably from 0 to 0.0001 weight-%, more preferably from 0 to 0.00001 weight-%, of the first metal consists of copper, calculated as CuO. It is more preferred that the 12-membered ring pore zeolitic material contained in the first coating does not comprise copper.

Therefore, the present invention preferably relates to a catalyst for the selective catalytic reduction of nitrogen oxide, the catalyst comprising
(i) a substrate comprising an inlet end, an outlet end, a substrate axial length extending from the inlet end to the outlet end and a plurality of passages defined by internal walls of the flow through substrate extending therethrough;
(ii) a first coating comprising a 12-membered ring pore zeolitic material comprising a first metal which is iron, wherein said 12-membered ring pore zeolitic material comprises said first metal in an amount of z1 weight-%, calculated as the weight of the first metal, calculated as $Fe_2O_3$, divided by the weight of the 12-membered ring pore zeolitic material comprising the first metal, the 12-membered ring pore zeolitic material contained in the first coating has a framework type BEA;
(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal;
wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75; wherein the second coating extends over y % of the substrate axial length from the outlet end toward the inlet end of the substrate, wherein y is in the range of from 25 to 90;
wherein the ratio z1:z2 is in the range of from 0.5:1 to 0.95:1.

In the context of the present invention, it is preferred that from 95 to 100 weight-%, more preferably from 98 to 100 weight-%, more preferably from 99 to 100 weight-% of the framework structure of the 12-membered ring pore zeolitic material consist of Si, Al, O, and optionally H. It is preferred that, in the framework structure of the 12-membered ring pore zeolitic material, the molar ratio of Si to Al, calculated as molar $SiO_2:Al_2O_3$, is in the range of from 2:1 to 37:1, more preferably in the range of from 3:1 to 35:1, more preferably in the range of from 4:1 to 20:1, more preferably in the range of from 5:1 to 15:1. It is more preferred that the molar ratio of Si to Al is in the range of from 6:1 to 12:1.

In the context of the present invention, it is preferred that the 12-membered ring pore zeolitic material, more preferably a zeolitic material having a framework type BEA, is prepared by a template-free process.

It is preferred that the first coating comprises the 12-membered ring pore zeolitic material, comprising the first metal, in an amount in the range of from 70 to 98 weight-%, more preferably in the range of from 75 to 97 weight-%, more preferably in the range of from 80 to 95 weight-%, more preferably in the range of from 85 to 92 weight-%, based on the weight of the first coating.

It is preferred that the first coating further comprises a 10-membered ring pore zeolitic material comprising a third metal which is one or more of copper and iron. It is preferred that the third metal is iron.

As the 10-membered ring pore zeolitic material contained in the first coating, it is preferred that it has a framework type selected from the group consisting of MFI, MWW, AEL, HEU, FER, AFO, a mixture of two or more thereof and a mixed type of two or more thereof. It is more preferred that the 10-membered ring pore zeolitic material contained in the first coating has a framework type MFI.

It is preferred that the 10-membered ring pore zeolitic material contained in the first coating comprises a third metal which is iron. It is preferred that said 10-membered ring pore zeolitic material comprises iron in an amount in the range of from 0.5 to 9 weight-%, more preferably in the range of from 1 to 7 weight-%, more preferably in the range of from 1.5 to 6 weight-%, more preferably in the range of from 2 to 5 weight-%, more preferably in the range of from 2.5 to 4.5 weight-%, calculated as the weight of the third metal, calculated as $Fe_2O_3$, divided by the weight of the 10-membered ring pore zeolitic material comprising the third metal.

Preferably from 0 to 0.001 weight-%, more preferably from 0 to 0.0001 weight-%, more preferably from 0 to 0.00001 weight-%, of the third metal consists of copper, calculated as CuO. It is preferred that the 10-membered ring pore zeolitic material contained in the first coating does not comprise copper.

Preferably from 95 to 100 weight-%, more preferably from 98 to 100 weight-%, more preferably from 99 to 100 weight-% of the framework structure of the 10-membered ring pore zeolitic material consist of Si, Al, O, and optionally H.

It is preferred that, in the framework structure of the 10-membered ring pore zeolitic material, the molar ratio of Si to Al, calculated as molar $SiO_2:Al_2O_3$, is in the range of from 2:1 to 60:1, more preferably in the range of from 5:1 to 50:1, more preferably in the range of from 10:1 to 40:1, more preferably in the range of from 15:1 to 35:1, more preferably in the range of from 20:1 to 30:1, more preferably in the range of from 23:1 to 29:1.

It is preferred that the first coating comprises the 10-membered ring pore zeolitic material, comprising the third metal, in an amount in the range of from 1 to 8 weight-%, more preferably in the range of from 2 to 7 weight-%, more preferably in the range of from 3 to 6 weight-%, based on the weight of the first coating.

It is preferred that the first coating further comprises an oxidic binder, wherein the oxidic binder more preferably comprises one or more of zirconia, alumina, titania, silica, and a mixed oxide comprising two or more of Zr, Al, Ti, and Si, more preferably comprises one or more of silica, alumina and zirconia, more preferably comprises one or more of silica and zirconia, more preferably silica.

It is preferred that the first coating comprises the oxidic binder in an amount in the range of from 0.5 to 8 weight-%, more preferably in the range of from 2 to 7 weight-%, more preferably in the range of from 3 to 6 weight-%, based on the weight of the first coating.

Therefore, the present invention preferably relates to a catalyst for the selective catalytic reduction of nitrogen oxide, the catalyst comprising
(i) a substrate comprising an inlet end, an outlet end, a substrate axial length extending from the inlet end to the outlet end and a plurality of passages defined by internal walls of the flow through substrate extending therethrough;
(ii) a first coating comprising a 12-membered ring pore zeolitic material comprising a first metal which is iron, wherein said 12-membered ring pore zeolitic material comprises said first metal in an amount of z1 weight-%, calculated as the weight of the first metal, calculated as $Fe_2O_3$, divided by the weight of the 12-membered ring pore zeolitic material comprising the first metal, wherein the 12-membered ring pore zeolitic material contained in the first coating has a framework type BEA,
wherein the first coating further comprises a 10-membered ring pore zeolitic material, more preferably a zeolitic material having a framework type MFI, comprising a third metal which is one or more of copper and iron, more preferably iron,
wherein the first coating more preferably further comprises an oxidic binder;
(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal;
wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75;
wherein the second coating extends over y % of the substrate axial length from the outlet end toward the inlet end of the substrate, wherein y is in the range of from 25 to 90;
wherein the ratio z1:z2 is in the range of from 0.5:1 to 0.95:1.

In the context of the present invention, it is preferred that from 95 to 100 weight-%, more preferably from 98 to 100 weight-%, more preferably from 99 to 100 weight-%, more preferably from 99.5 to 100 weight-%, of the first coating consist of a 12-membered ring pore zeolitic material comprising the first metal which is one or more of copper and iron, and preferably one or more of the 10-membered ring pore zeolitic material comprising the third metal as defined in the foregoing and the oxidic binder as defined in the foregoing, more preferably the 10-membered ring pore zeolitic material comprising the third metal as defined in the foregoing and the oxidic binder as defined in the foregoing.

It is preferred that the first coating is present in the catalyst at a loading in the range of from 1.5 to 5 $g/in^3$, more preferably in the range of from 2 to 4 $g/in^3$, more preferably in the range of from 2.5 to 3.5 $g/in^3$.

It is preferred that at most 10 ppm, more preferably from 0 to 5 ppm, more preferably from 0 to 2 ppm, more preferably from 0 to 1 ppm, more preferably from 0 to 0.5 ppm, of the first coating consists of platinum, more preferably of platinum, palladium and rhodium, more preferably of any platinum group metal. In other words, it is preferred that the first coating is substantially free, more preferably free, of platinum, more preferably of platinum, palladium and rhodium, more preferably of any platinum group metal.

It is preferred that from 0 to 0.01 weight-%, more preferably from 0 to 0.001 weight-%, more preferably from 0 to 0.0001 weight-%, of the first coating consists of a 8-membered ring pore zeoltic material. In other words, it is preferred that the first coating is substantially free, more preferably free, of a 8-membered ring pore zeoltic material.

Preferably from 0 to 0.001 weight-%, more preferably from 0 to 0.0001 weight-%, more preferably from 0 to 0.00001 weight-%, of the first coating consists of copper, calculated as CuO. In other words, it is preferred that the first coating is substantially free, more preferably free, of copper.

It is preferred that the first coating (ii) has an ammonia storage capacity $A1_{(NH3)}$ of at least 2.1 mmol/g, more preferably in the range of from 2.2 to 10.0 mmol/g, more preferably in the range of from 2.5 to 5.0 mmol/g, the ammonia storage capacity being determined as defined in Reference Example 1.

As to the second coating, it is preferred that the 8-membered ring pore zeolitic material contained in said second coating has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, a mixture of two or more thereof and a mixed type of two or more thereof, more preferably selected from the group consisting of CHA and AEI, more preferably a framework type CHA.

It is preferred that the 8-membered ring pore zeolitic material contained in the second coating comprises a second metal which is copper. It is preferred that said 8-membered ring pore zeolitic material comprises copper in an amount of z2 weight-%, calculated as the weight of the second metal, calculated as CuO, divided by the weight of the 8-membered ring pore zeolitic material comprising the second metal, wherein z2 is in the range of from 2.0 to 15, more preferably in the range of from 3 to 10, more preferably in the range of from 4 to 8, more preferably in the range of from 4.5 to 7, more preferably in the range of from 4.9 to 6.

It is preferred that from 0 to 0.001 weight-%, more preferably from 0 to 0.0001 weight-%, more preferably from 0 to 0.00001 weight-%, of the first metal consists of iron, calculated as $Fe_2O_3$. It is preferred that the 8-membered ring pore zeolitic material contained in the second coating does not comprise iron.

Preferably from 95 to 100 weight-%, more preferably from 98 to 100 weight-%, more preferably from 99 to 100 weight-%, of the framework structure of the 8-membered ring pore zeolitic material consist of Si, Al, O, and optionally H. It is preferred that, in the framework structure, the molar ratio of Si to Al, calculated as molar $SiO_2:Al_2O_3$, is in the range of from 2:1 to 50:1, more preferably in the range of from 2:1 to 45:1, more preferably in the range of from 10:1 to 35:1, more preferably in the range of from 15:1 to 25:1, more preferably in the range of from 16:1 to 22:1.

It is preferred that the second coating comprises the 8-membered ring pore zeolitic material, comprising the second metal, in an amount in the range of from 85 to 99 weight-%, more preferably in the range of from 90 to 98 weight-%, more preferably in the range of from 92 to 97 weight-%, based on the weight of the second coating.

It is preferred that the second coating further comprises an oxidic binder, wherein the oxidic binder more preferably comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia.

It is preferred that the second coating comprises the oxidic binder in an amount in the range of from 0.5 to 8 weight-%, more preferably in the range of from 2 to 7 weight-%, more preferably in the range of from 3 to 6 weight-%, based on the weight of the first coating.

Therefore, the present invention preferably relates to a catalyst for the selective catalytic reduction of nitrogen oxide, the catalyst comprising (i) a substrate comprising an inlet end, an outlet end, a substrate axial length extending from the inlet end to the outlet end and a plurality of passages defined by internal walls of the flow through substrate extending therethrough;

(ii) a first coating comprising a 12-membered ring pore zeolitic material comprising a first metal which is iron, wherein said 12-membered ring pore zeolitic material comprises said first metal in an amount of z1 weight-%, calculated as the weight of the first metal, calculated as $Fe_2O_3$, divided by the weight of the 12-membered ring pore zeolitic material comprising the first metal;

(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal, wherein the 8-membered ring pore zeolitic material has a framework type CHA, wherein the second coating further comprises an oxidic binder;

wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75;

wherein the second coating extends over y % of the substrate axial length from the outlet end toward the inlet end of the substrate, wherein y is in the range of from 25 to 90;

wherein the ratio z1:z2 is in the range of from 0.5:1 to 0.95:1.

More preferably, the present invention relates to a catalyst for the selective catalytic reduction of nitrogen oxide, the catalyst comprising (i) a substrate comprising an inlet end, an outlet end, a substrate axial length extending from the inlet end to the outlet end and a plurality of passages defined by internal walls of the flow through substrate extending therethrough;

(ii) a first coating comprising a 12-membered ring pore zeolitic material comprising a first metal which is iron, wherein said 12-membered ring pore zeolitic material comprises said first metal in an amount of z1 weight-%, calculated as the weight of the first metal, calculated as $Fe_2O_3$, divided by the weight of the 12-membered ring pore zeolitic material comprising the first metal, the 12-membered ring pore zeolitic material contained in the first coating has a framework type BEA, wherein the first coating further comprises a 10-membered ring pore zeolitic material, more preferably a zeolitic material having a framework type MFI, comprising a third metal which is one or more of copper and iron, more preferably iron, wherein the first coating more preferably further comprises an oxidic binder;

(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal, wherein the 8-membered ring pore zeolitic material has a framework type CHA, wherein the second coating further comprises an oxidic binder;

wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75;

wherein the second coating extends over y % of the substrate axial length from the outlet end toward the inlet end of the substrate, wherein y is in the range of from 25 to 90; wherein the ratio z1:z2 is in the range of from 0.5:1 to 0.95:1.

In the context of the present invention, it is preferred that from 95 to 100 weight-%, more preferably from 98 to 100 weight-%, more preferably from 99 to 100 weight-%, more preferably from 99.5 to 100 weight-%, of the second coating consist of the 8-membered ring pore zeolitic material comprising the second metal which is one or more of copper and iron, more preferably copper, and more preferably the oxidic binder as defined in the foregoing.

It is preferred that the second coating is present in the catalyst at a loading in the range of from 1.5 to 5 $g/in^3$, more preferably in the range of from 1.75 to 4 $g/in^3$, more preferably in the range of from 2 to 3.5 $g/in^3$.

It is preferred that at most 10 ppm, more preferably from 0 to 5 ppm, more preferably from 0 to 2 ppm, more preferably from 0 to 1 ppm, more preferably from 0 to 0.5 ppm, of the second coating consists of platinum, more preferably of platinum, palladium and rhodium, more preferably of any platinum group metal. In other words, it is preferred that the second coating is substantially free, more preferably free, of platinum, more preferably of platinum, palladium and rhodium, more preferably of any platinum group metal.

Preferably from 0 to 0.01 weight-%, more preferably from 0 to 0.001 weight-%, more preferably from 0 to 0.0001 weight-%, of the second coating consists of a 12-membered ring pore zeoltic material. In other words, it is preferred that the second coating is substantially free, more preferably free, of a 12-membered ring pore zeoltic material.

Preferably from 0 to 0.01 weight-%, more preferably from 0 to 0.001 weight-%, more preferably from 0 to 0.0001 weight-%, of the second coating consists of a 10-membered ring pore zeoltic material. In other words, it is preferred that the second coating is substantially free, more preferably free, of a 10-membered ring pore zeoltic material.

It is preferred that from 0 to 0.001 weight-%, more preferably from 0 to 0.0001 weight-%, more preferably from 0 to 0.00001 weight-%, of the second coating consists of iron, calculated as $Fe_2O_3$. In other words, it is preferred that the second coating is substantially free, more preferably free, of iron.

It is preferred that the second coating (iii) has an ammonia storage capacity $A2_{(NH3)}$ of less than 2 mmol/g, more preferably in the range of from 0.5 to 1.99 mmol/g, more preferably in the range of from 1 to 1.95 mmol/g, the ammonia storage capacity being determined as defined in Reference Example 1.

It is preferred that the substrate is a flow-through substrate or a wall-flow filter substrate, more preferably a flow-through substrate.

It is preferred that the flow through substrate comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably cordierite.

It is preferred that the substrate has a substrate length in the range of from 1 to 15 inches, more preferably in the range of from 2 to 10 inches.

It is preferred that the substrate has a substrate width in the range of from 0.5 to 3 inches, more preferably in the range of from 0.75 to 2 inches.

It is preferred that the catalyst comprises, more preferably consists of, the substrate (i), which is one substrate, the first coating (ii) and the second coating (iii).

It is preferred that the substrate comprises a first upstream substrate and a second downstream substrate, wherein the first coating (ii) is disposed on the first upstream substrate and the second coating (ii) is disposed on the second downstream substrate. It is more preferred that there is less than 0.2 inch, more preferably no gap, between the first upstream substrate and the second downstream substrate which are juxtaposed.

Preferably, the first upstream substrate is a flow-through substrate, more preferably a cordierite flow-through substrate. Preferably, the second downstream substrate is a flow-through substrate, more preferably a cordierite flow-through substrate.

It is preferred that the first upstream substrate and the second downstream substrate are the same, in terms of chemical composition and physical properties. It might be preferred that they have the same dimensions (diameter and/or length).

In the context of the present invention, it is also conceivable that the first coating (ii) and the second coating (iii) are disposed on more than a first upstream substrate and a second downstream substrate as mentioned above, such as a first upstream substrate, a second downstream substrate and a third middle substrate disposed/positioned between said first upstream substrate and said second downstream substrate.

It is preferred that the first upstream substrate, the third middle substrate and the second downstream substrate are the same, in terms of chemical composition and physical properties. It might be preferred that they have the same dimensions (diameter and/or length).

It is preferred that the first coating (ii) has an ammonia storage capacity $A1_{(NH3)}$ and the second coating (iii) has an ammonia storage capacity $A2_{(NH3)}$, wherein $A1_{(NH3)}$ is superior to $A2_{(NH3)}$, the ammonia storage capacity being determined as defined in Reference Example 1.

It is preferred that the ratio of $A1_{(NH3)}:A2_{(NH3)}$ is in the range of from 1.25:1 to 3:1, more preferably in the range of from 1.3:1 to 2:1, more preferably in the range of from 1.35:1 to 1.9:1.

The present invention further relates to process for preparing a catalyst for the selective catalytic reduction of nitrogen oxide according to the present invention, the process comprising (1) providing a substrate comprising an inlet end, an outlet end, a substrate axial length extending from the inlet end to the outlet end and a plurality of passages defined by internal walls of the flow through substrate extending therethrough;

(2) preparing a first mixture comprising water and a 12-membered ring pore zeolitic material comprising a first metal which is one or more of copper and iron, wherein said 12-membered ring pore zeolitic material comprises said first metal in an amount of z1 weight %, calculated as the weight of the first metal, calculated as CuO and $Fe_2O_3$, divided by the weight of the 12-membered ring pore zeolitic material comprising the first metal;

(3) disposing the first mixture obtained in (2) on the surface of the internal walls of the substrate provided in (1), over x % of the substrate axial length from the inlet end toward the outlet end of the substrate, wherein x is in the range of from 10 to 75;

(4) drying the mixture-treated substrate obtained in (3), obtaining the substrate having a first coating disposed thereon; optionally calcining;

(5) preparing a second mixture comprising water and a 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal;

(6) disposing the second mixture obtained in (5) on the substrate having a first coating disposed thereon obtained in (4) over y % of the substrate axial length from the outlet end toward the inlet end of the substrate, wherein y is in the range of from 25 to 90;

(7) drying the mixture-treated substrate obtained in (6), obtaining the substrate having a first coating and a second coating disposed thereon;

(8) calcining the substrate having a first coating and a second coating disposed thereon obtained in (7), obtaining the catalyst;

wherein the ratio z1:z2 is in the range of from 0.5:1 to 0.95:1.

As to (2), it is preferred that it further comprises
(2.1) preparing a 12-membered ring pore zeolitic material, more preferably the 12-membered ring pore zeolitic material as defined in the foregoing;
(2.2) mixing a source of a first metal, more preferably an iron salt, with the 12-membered ring pore zeolitic material obtained in (2.1);
(2.3) calcining the mixture obtained in (2.2), obtaining a 12-membered ring pore zeolitic material comprising the first metal, more preferably comprising iron;
(2.4) admixing water and the 12-membered ring pore zeolitic material comprising the first metal, more preferably comprising iron, and more preferably an organic acid, more preferably tartaric acid.

As to (2), it is preferred that it further comprises
(2.5) adding a 10-membered ring pore zeolitic material comprising a third metal to the mixture obtained in (2.4), more preferably the 10-membered ring pore zeolitic material as defined in the foregoing;
(2.6) more preferably adding a source of an oxidic binder, more preferably colloidal silica, to the mixture obtained in (2.5);
(2.7) more preferably adding an additive to the mixture obtained in (2.6).

It is preferred that drying according to (4) is performed in a gas atmosphere having a temperature in the range of from 100 to 160° C., more preferably in the range of from 120 to 140° C., the gas atmosphere more preferably comprising oxygen, more preferably being air.

It is preferred that drying according to (4) is performed for a duration in the range of from 5 minutes to 2 hours, more preferably in the range of from 10 minutes to 1 hour.

It is preferred that, after drying, calcining according to (4) is performed in a gas atmosphere having a temperature in the range of from 450 to 700° C., more preferably in the range of from 500 to 600° C., the gas atmosphere more preferably comprising oxygen, more preferably being air.

It is preferred that, after drying, calcining according to (4) is performed for a duration in the range of from 5 minutes to 2 hours, more preferably in the range of from 10 minutes to 1 hour.

As to (5), it is preferred that it comprises
(5.1) preparing a 8-membered ring pore zeolitic material comprising a second metal which is one or more of copper and iron, more preferably copper, more preferably the 8-membered ring pore zeolitic material is as defined in the foregoing;
(5.2) admixing water and the 8-membered ring pore zeolitic material comprising a second metal which is one or more of copper and iron, more preferably copper, obtained in (5.1);
(5.3) adding a source of an oxidic binder, more preferably zirconium acetate, to the mixture obtained in (5.2).

As drying according to (7), it is preferred that it is performed in a gas atmosphere having a temperature in the range of from 100 to 160° C., more preferably in the range of from 120 to 140° C., the gas atmosphere more preferably comprising oxygen, more preferably being air.

As to drying according to (7), it is preferred that it is performed for a duration in the range of from 5 minutes to 2 hours, more preferably in the range of from 10 minutes to 1 hour.

It is preferred that, after drying, calcining according to (7) is performed in a gas atmosphere having a temperature in the range of from 400 to 600° C., more preferably in the range of from 450 to 550° C., the gas atmosphere more preferably comprising oxygen, more preferably being air.

It is preferred that, after drying, calcining according to (7) is performed for a duration in the range of from 5 minutes to 2 hours, more preferably in the range of from 10 minutes to 1 hour.

It is preferred that x is in the range of from 20 to 72, more preferably in the range of from 22 to 70, more preferably in the range of from 25 to 68.

It is preferred that y is in the range of from 27 to 80, more preferably in the range of from 30 to 78, more preferably in the range of from 32 to 75.

It is preferred that y is 100−x.

It is preferred that the second coating is disposed on the surface of the internal walls of the substrate.

When x<y, it is preferred that x is in the range of 10 to 45, more preferably in the range of from 20 to 40, more preferably in the range of from 25 to 35. Alternatively, when x>y, it is preferred that x is in the range of 55 to 75, more preferably in the range of from 60 to 72, more preferably in the range of from 62 to 70, more preferably in the range of from 63 to 68.

It is preferred that there is no overlap of the first coating and the second coating.

It is preferred that the process of the present invention consists of (1), (2), (3), (4), (5), (6) and (7).

The present invention further relates to a catalyst for the selective catalytic reduction of nitrogen oxide, more preferably a catalyst for the selective catalytic reduction of nitrogen oxide according to the present invention and as defined in the foregoing, obtainable or obtained by a process according to the present invention and as defined in the foregoing.

The present invention further relates to an exhaust gas treatment system for treating an exhaust gas exiting from a combustion engine, preferably a diesel engine, the system comprising one or more catalysts for the selective catalytic reduction of nitrogen oxide according to the present invention, and one or more of a diesel oxidation catalyst, a catalyzed soot filter and an ammonia oxidation catalyst.

According to a first aspect of the present invention, it is preferred that the system comprises a diesel oxidation catalyst, a catalyzed soot filter and one or more catalysts for the selective catalytic reduction of nitrogen oxide according to the present invention.

According to said first aspect, it is preferred that the diesel oxidation catalyst is positioned upstream of the catalyzed soot filter, wherein the catalyzed sot filter is positioned upstream of the one or more catalysts for the selective catalytic reduction of nitrogen oxide according to the present invention.

According to said first aspect, it is preferred that the catalyzed soot filter is positioned upstream of two catalysts for the selective catalytic reduction of nitrogen oxide according to the present invention, wherein the two catalysts for the selective catalytic reduction of nitrogen oxide are positioned parallel to each other.

According to the first aspect, it is more preferred that the system further comprises two ammonia oxidation catalysts, wherein each ammonia oxidation catalyst is positioned downstream of one catalyst for the selective catalytic reduction of nitrogen oxide according to the present invention. Thus, the two ammonia oxidation catalysts are preferably also positioned parallel to each other.

According to a second aspect of the present invention, it is preferred that the system comprises the catalyst for the selective catalytic reduction of nitrogen oxide according to the present invention and a catalyzed soot filter.

According to said second aspect, it is preferred that the catalyzed soot filter is positioned downstream of the catalyst for the selective catalytic reduction of nitrogen oxide according to the present invention.

According to said second aspect, it is preferred that the system further comprises a diesel oxidation catalyst, wherein the diesel oxidation catalyst is positioned downstream of the catalyst for the selective catalytic reduction of nitrogen oxide according to the present invention and upstream of the catalyzed soot filter.

According to the second aspect, it is preferred that the system further comprises an ammonia oxidation catalyst which is positioned downstream of the catalyzed particulate filter.

The present invention further relates to a use of a catalyst according the present invention for the selective catalytic reduction of nitrogen oxide comprised in an exhaust gas stream, preferably from a diesel engine.

The present invention further relates to a use of the exhaust gas treatment system according to the present invention for the treatment of an exhaust gas stream from a diesel engine.

The present invention further relates to a method for selectively catalytically reducing NOx, wherein the NOx are comprised in an exhaust gas stream, said method comprising
(1) providing the exhaust gas stream, preferably from a diesel engine;
(2) passing the exhaust gas stream provided in (1) through the catalyst according to the present invention.

The present invention further relates to a method for treating an exhaust gas stream from a diesel engine, said method comprising
(1') providing said exhaust gas stream;
(2') passing the exhaust gas stream provided in (1') through the exhaust gas treatment system according to the present invention.

II. A Further Catalyst for the Selective Catalytic Reduction of NOx

Therefore, the present invention further relates to a catalyst for the selective catalytic reduction of nitrogen oxide, the catalyst comprising
  a substrate comprising an inlet end, an outlet end, a substrate axial length extending from the inlet end to the outlet end and a plurality of passages defined by internal walls of the flow through substrate extending therethrough;
  a coating disposed on the surface of the internal walls of the substrate, which surface defines the interface between the internal walls and the passages, the coating comprising a 12-membered ring pore zeolitic material comprising a first metal which is one or more of copper and iron, wherein said 12-membered ring pore zeolitic material comprises said first metal in an amount of z weight-%, calculated as the weight of the first metal, calculated as CuO and $Fe_2O_3$, divided by the weight of the 12-membered ring pore zeolitic material comprising the first metal and
  wherein the coating further comprises a 10-membered ring pore zeolitic material comprising a second metal which is one or more of copper and iron, wherein said 10-membered ring pore zeolitic material comprises said second metal in an amount of y weight-%, calculated as the weight of the second metal, calculated as CuO and $Fe_2O_3$, divided by the weight of the 10-membered ring pore zeolitic material comprising the second metal;
  wherein y is in the range of from 0.5 to 9 and wherein y<z.

It is preferred that the coating extends over 90 to 100%, more preferably over 95 to 100%, more preferably over 98 to 100% of the substrate axial length.

It is preferred that the 12-membered ring pore zeolitic material contained in the coating has a framework type selected from the group consisting of BEA, FAU, USY, GME, MOR, OFF, a mixture of two or more thereof and a mixed type of two or more thereof, more preferably selected from the group consisting of BEA, FAU, a mixture of two or more thereof and a mixed type of two or more thereof, more preferably a framework type BEA.

It is preferred that the 12-membered ring pore zeolitic material contained in the coating comprises a first metal which is iron. It is preferred that said 12-membered ring pore zeolitic material comprises iron in an amount of z weight-%, calculated as the weight of the first metal, calculated as $Fe_2O_3$, divided by the weight of the 12-membered ring pore zeolitic material comprising the first metal, wherein z is in the range of from 1.0 to 10, more preferably in the range of from 1.5 to 8, more preferably in the range of from 2 to 6, more preferably in the range of from 3 to 5, more preferably in the range of from 3.5 to 4.8.

It is preferred that from 0 to 0.001 weight-%, more preferably from 0 to 0.0001 weight-%, more preferably from 0 to 0.00001 weight-%, of the first metal consists of copper, calculated as CuO. It is preferred that the 12-membered ring pore zeolitic material contained in the coating does not comprise copper.

Preferably from 95 to 100 weight-%, more preferably from 98 to 100 weight-%, more preferably from 99 to 100 weight-% of the framework structure of the 12-membered ring pore zeolitic material consist of Si, Al, O, and optionally H, wherein in the framework structure, the molar ratio of Si to Al, calculated as molar $SiO_2:Al_2O_3$, is more preferably in the range of from 2:1 to 37:1, more preferably in the range of from 3:1 to 35:1, more preferably in the range of from 4:1 to 20:1, more preferably in the range of from 5:1 to 15:1. It is more preferred that the molar ratio of Si to Al is in the range of from 6:1 to 12:1.

In the context of the present invention, it is preferred that the 12-membered ring pore zeolitic material, more preferably a zeolitic material having a framework type BEA, is prepared by a template-free process.

It is preferred that the coating comprises the 12-membered ring pore zeolitic material comprising the first metal in an amount in the range of from 70 to 98 weight-%, more preferably in the range of from 75 to 97 weight-%, more preferably in the range of from 80 to 95 weight-%, more preferably in the range of from 85 to 92 weight-%, based on the weight of the coating.

It is preferred that the 10-membered ring pore zeolitic material comprising a second metal which is iron.

It is preferred that the 10-membered ring pore zeolitic material comprised in the coating has a framework type selected from the group consisting of MFI, MWW, AEL, HEU, FER, AFO, a mixture of two or more thereof and a mixed type of two or more thereof, wherein the 10-membered ring pore zeolitic material comprised in the coating more preferably has a framework type MFI.

Therefore, it is preferred that the present invention relates to a catalyst for the selective catalytic reduction of nitrogen oxide, the catalyst comprising
  a substrate comprising an inlet end, an outlet end, a substrate axial length extending from the inlet end to the outlet end and a plurality of passages defined by internal walls of the flow through substrate extending therethrough;

a coating disposed on the surface of the internal walls of the substrate, which surface defines the interface between the internal walls and the passages, the coating comprising a 12-membered ring pore zeolitic material comprising a first metal which is iron, wherein said 12-membered ring pore zeolitic material comprises said first metal in an amount of z weight-%, calculated as the weight of the first metal, calculated as $Fe_2O_3$, divided by the weight of the 12-membered ring pore zeolitic material comprising the first metal, wherein the 12-membered ring pore zeolitic material has a framework type BEA, and wherein the coating further comprises a 10-membered ring pore zeolitic material comprising a second metal which is iron, wherein said 10-membered ring pore zeolitic material comprises said second metal in an amount of y weight-%, calculated as the weight of the second metal, calculated as $Fe_2O_3$, divided by the weight of the 10-membered ring pore zeolitic material comprising the second metal, wherein the 10-membered ring pore zeolitic material comprised in the coating has a framework type MFI;

wherein y is in the range of from 0.5 to 9 and wherein y<z.

In the context of the present invention, it is preferred that the 10-membered ring pore zeolitic material contained in the coating comprises a second metal which is iron, wherein said 10-membered ring pore zeolitic material comprises iron in an amount of y weight-%, calculated as the weight of the second metal, calculated as $Fe_2O_3$, divided by the weight of the 10-membered ring pore zeolitic material comprising the second metal, wherein y preferably is in the range of from 1 to 7, more preferably in the range of from 1.5 to 6, more preferably in the range of from 2 to 5, more preferably in the range of from 2.5 to 4.5.

Preferably from 0 to 0.001 weight-%, more preferably from 0 to 0.0001 weight-%, more preferably from 0 to 0.00001 weight-%, of the second metal consists of copper, calculated as CuO. It is preferred that the 10-membered ring pore zeolitic material contained in the coating does not comprise copper.

Preferably from 95 to 100 weight-%, more preferably from 98 to 100 weight-%, more preferably from 99 to 100 weight-% of the framework structure of the 10-membered ring pore zeolitic material consist of Si, Al, O, and optionally H, wherein in the framework structure, the molar ratio of Si to Al, calculated as molar $SiO_2:Al_2O_3$, is more preferably in the range of from 2:1 to 60:1, more preferably in the range of from 5:1 to 50:1, more preferably in the range of from 10:1 to 40:1, more preferably in the range of from 15:1 to 35:1, more preferably in the range of from 20:1 to 30:1, more preferably in the range of from 23:1 to 29:1.

It is preferred that the coating comprises the 10-membered ring pore zeolitic material comprising the second metal in an amount in the range of from 1 to 8 weight-%, more preferably in the range of from 2 to 7 weight-%, more preferably in the range of from 3 to 6 weight-%, based on the weight of the coating.

It is preferred that the coating further comprises an oxidic binder, wherein the oxidic binder more preferably comprises one or more of zirconia, alumina, titania, silica, and a mixed oxide comprising two or more of Zr, Al, Ti, and Si, more preferably comprises one or more of silica, alumina and zirconia, more preferably comprises one or more of silica and zirconia, more preferably silica.

It is preferred that the coating comprises the oxidic binder in an amount in the range of from 0.5 to 8 weight-%, more preferably in the range of from 2 to 7 weight-%, more preferably in the range of from 3 to 6 weight-%, based on the weight of the coating.

Preferably from 95 to 100 weight-%, more preferably from 98 to 100 weight-%, more preferably from 99 to 100 weight-%, more preferably from 99.5 to 100 weight-% of the coating consist of a 12-membered ring pore zeolitic material comprising the first metal which is one or more of copper and iron, more preferably iron, the 10-membered ring pore zeolitic material comprising the second metal which is one or more of copper and iron, more preferably iron, and more preferably the oxidic binder as defined in the foregoing.

It is preferred that the coating is present in the catalyst at a loading in the range of from 1.5 to 5 g/in$^3$, more preferably in the range of from 2 to 4 g/in$^3$, more preferably in the range of from 2.5 to 3.5 g/in$^3$.

It is preferred that at most 10 ppm, more preferably from 0 to 5 ppm, more preferably from 0 to 2 ppm, more preferably from 0 to 1 ppm, more preferably from 0 to 0.5 ppm, of the coating consist of platinum, more preferably of platinum, palladium and rhodium, more preferably of any platinum group metal. In other words, it is preferred that the coating is substantially free, more preferably free, of platinum, palladium and rhodium, more preferably of any platinum group metal.

Preferably from 0 to 0.01 weight-%, more preferably from 0 to 0.001 weight-%, more preferably from 0 to 0.0001 weight-%, of the coating consists of a 8-membered ring pore zeoltic material. In other words, it is preferred that the coating is substantially free, more preferably free, of a 8-membered ring pore zeolitic material.

Preferably from 0 to 0.001 weight-%, more preferably from 0 to 0.0001 weight-%, more preferably from 0 to 0.00001 weight-%, of the coating consists of copper, calculated as CuO. In other words, it is preferred that the coating is substantially free, more preferably free, of copper.

It is preferred that the coating has an ammonia storage capacity $A1_{(NH3)}$ of at least 2.1 mmol/g, more preferably in the range of from 2.2 to 10.0 mmol/g, more preferably in the range of from 2.5 to 5.0 mmol/g, the ammonia storage capacity being determined as defined in Reference Example 1.

It is preferred that the catalyst of the present invention consists of the substrate and the coating.

The present invention further relates to a process for preparing the catalyst according to the present invention, the process comprising (1') providing a substrate comprising an inlet end, an outlet end, a substrate axial length extending from the inlet end to the outlet end and a plurality of passages defined by internal walls of the flow through substrate extending therethrough;

(2') preparing a mixture comprising water, a 12-membered ring pore zeolitic material comprising a first metal which is one or more of copper and iron, wherein said 12-membered ring pore zeolitic material comprises said first metal in an amount of z weight-%, calculated as the weight of the first metal, calculated as CuO and $Fe_2O_3$, divided by the weight of the 12-membered ring pore zeolitic material comprising the first metal and the mixture further comprising a 10-membered ring pore zeolitic material comprising a second metal which is one or more of copper and iron, wherein said 10-membered ring pore zeolitic material comprises said second metal in an amount of y weight-%, calculated as the weight of the second metal, calculated as CuO and Fe$_2$O$_3$, divided by the weight of the 10-membered ring pore zeolitic material comprising the second metal;

(3') disposing the mixture obtained in (2') on the surface of the internal walls of the substrate provided in (1'), over x % of the substrate axial length from the inlet end toward the outlet end of the substrate, wherein x is in the range of from 10 to 75;

(4') drying the mixture-treated substrate obtained in (3'), obtaining the substrate having a coating disposed thereon;

(5') calcining the substrate having a coating disposed thereon obtained in (4'), obtaining the catalyst;

wherein y is in the range of from 0.5 to 9 and wherein y<z.

It is preferred that (2') further comprises (2'.1) preparing a 12-membered ring pore zeolitic material, more preferably the 12-membered ring pore zeolitic material as defined in the foregoing;

(2'.2) mixing a source of a first metal, preferably an iron salt, with the 12-membered ring pore zeolitic material obtained in (2'.1);

(2'.3) calcining the mixture obtained in (2'.2), obtaining a 12-membered ring pore zeolitic material comprising the first metal, more preferably comprising iron;

(2'.4) admixing water and the 12-membered ring pore zeolitic material comprising the first metal, more preferably comprising iron, and more preferably an organic acid, more preferably tartaric acid;

(2'.5) adding a 10-membered ring pore zeolitic material comprising a second metal to the mixture obtained in (2'.4), more preferably the 10-membered ring pore zeolitic material as defined in the foregoing;

(2'.6) more preferably adding a source of an oxidic binder, more preferably colloidal silica, to the mixture obtained in (2'.5);

(2'.7) more preferably adding an additive to the mixture obtained in (2'.6). It is more preferred that (2') further comprises (2'.1) preparing a 12-membered ring pore zeolitic material, more preferably the 12-membered ring pore zeolitic material as defined in the foregoing;

(2'.2) mixing a source of a first metal, preferably an iron salt, with the 12-membered ring pore zeolitic material obtained in (2'.1);

(2'.3) calcining the mixture obtained in (2'.2), obtaining a 12-membered ring pore zeolitic material comprising the first metal, more preferably comprising iron;

(2'.4) admixing water and the 12-membered ring pore zeolitic material comprising the first metal, more preferably comprising iron, and more preferably an organic acid, more preferably tartaric acid;

(2'.5) adding a 10-membered ring pore zeolitic material comprising a second metal to the mixture obtained in (2'.4), more preferably the 10-membered ring pore zeolitic material as defined in the foregoing;

(2'.6) adding a source of an oxidic binder, more preferably colloidal silica, to the mixture obtained in (2'.5);

(2'.7) adding an additive to the mixture obtained in (2'.6).

As to drying according to (4'), it is preferred that it is performed in a gas atmosphere having a temperature in the range of from 100 to 160° C., more preferably in the range of from 120 to 140° C., the gas atmosphere more preferably comprising oxygen, more preferably being air.

As to drying according to (4'), it is preferred that it is performed for a duration in the range of from 5 minutes to 2 hours, more preferably in the range of from 10 minutes to 1 hour.

As to calcining according to (5'), it is preferred that it is performed in a gas atmosphere having a temperature in the range of from 450 to 700° C., more preferably in the range of from 500 to 600° C., the gas atmosphere more preferably comprising oxygen, more preferably being air.

It is preferred that calcining according to (5') is performed for a duration in the range of from 5 minutes to 2 hours, more preferably in the range of from 10 minutes to 1 hour.

It is preferred that the process consists of (1'), (2'), (3'), (4') and (5').

The present invention further relates to a catalyst for the selective catalytic reduction of nitrogen oxide, preferably a catalyst for the selective catalytic reduction of nitrogen oxide according to the present invention, obtainable or obtained by a process according to the present invention.

The present invention relates to a catalyst for the selective catalytic reduction of nitrogen oxide comprising a first catalyst for the selective catalytic reduction of nitrogen oxide according to the present invention and as defined under item II, wherein the coating of the first catalyst for the selective catalytic reduction of nitrogen oxide according to the present invention and defined under item II preferably is the first coating (ii) defined under item I; and a second catalyst for the selective catalytic reduction of nitrogen oxide comprising a substrate comprising an inlet end, an outlet end, a substrate axial length extending from the inlet end to the outlet end and a plurality of passages defined by internal walls of the flow through substrate extending therethrough;

a coating disposed on the surface of the internal walls of the substrate, wherein the coating is the second coating (iii) defined in under item I;

wherein the first catalyst is disposed upstream of the second catalyst and wherein there is preferably less than 0.2 inch, more preferably no gap, between the substrate of the first catalyst and the substrate of the second catalyst which are juxtaposed.

It is preferred that the substrate of the first catalyst is defined as the substrate defined under item I. It is preferred that the substrate of the second catalyst is defined as the substrate defined under item I.

It is more preferred that the substrate of the first catalyst and the substrate of the second catalyst are the same, in terms of chemical composition, physical properties and dimensions.

The present invention is illustrated by the following first set of embodiments and combinations of embodiments resulting from the dependencies and back-references as indicated. The first set of embodiments may be combined with the second set of embodiments below. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. A catalyst for the selective catalytic reduction of nitrogen oxide, the catalyst comprising (i) a substrate comprising an inlet end, an outlet end, a substrate axial length extending from the inlet end to the outlet end and a plurality of passages defined by internal walls of the flow through substrate extending therethrough;

(ii) a first coating comprising a 12-membered ring pore zeolitic material comprising a first metal which is one or more of copper and iron, wherein said 12-membered ring pore zeolitic material comprises said first metal in an amount of z1 weight-%, calculated as the weight of the first metal, calculated as $CuO$ and $Fe_2O_3$, divided by the weight of the 12-membered ring pore zeolitic material comprising the first metal;

(iii) a second coating comprising an 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as $CuO$ and $Fe_2O_3$, divided by the weight of the 8-membered ring pore zeolitic material comprising the second metal;

wherein the first coating is disposed on the surface of the internal walls of the substrate, which surface defines the interface between the internal walls and the passages, and extends over x % of the substrate axial length from the inlet end toward the outlet end of the substrate, wherein x is in the range of from 10 to 75;

wherein the second coating extends over y % of the substrate axial length from the outlet end toward the inlet end of the substrate, wherein y is in the range of from 25 to 90; wherein the ratio z1:z2 is in the range of from 0.5:1 to 0.95:1.

2. The catalyst of embodiment 1, wherein x is in the range of from 20 to 72, preferably in the range of from 22 to 70, more preferably in the range of from 25 to 68.

3. The catalyst of embodiment 1 or 2, wherein y is in the range of from 27 to 80, preferably in the range of from 30 to 78, more preferably in the range of from 32 to 75.

4. The catalyst of any one of embodiments 1 to 3, wherein y is 100−x.

5. The catalyst of any of embodiments 1 to 4, wherein the second coating is disposed on the surface of the internal walls of the substrate.

6. The catalyst of any one of embodiments 1 to 5, wherein x<y, wherein x is in the range of 10 to 45, preferably in the range of from 20 to 40, more preferably in the range of from 25 to 35; or
wherein x>y, wherein x is in the range of 55 to 75, preferably in the range of from 60 to 72, more preferably in the range of from 62 to 70, more preferably in the range of from 63 to 68.

7. The catalyst of any one of embodiments 1 to 6, wherein there is no overlap of the first coating and the second coating.

8. The catalyst of any one of embodiments 1 to 7, wherein the 12-membered ring pore zeolitic material contained in the first coating has a framework type selected from the group consisting of BEA, FAU, USY, GME, MOR, OFF, a mixture of two or more thereof and a mixed type of two or more thereof, preferably selected from the group consisting of BEA, FAU, a mixture of two or more thereof and a mixed type of two or more thereof, wherein the 12-membered ring pore zeolitic material contained in the first coating more preferably has a framework type BEA.

9. The catalyst of any one of embodiments 1 to 8, wherein the 12-membered ring pore zeolitic material contained in the first coating comprises a first metal which is iron, wherein said 12-membered ring pore zeolitic material comprises iron in an amount of z1 weight-%, calculated as the weight of the first metal, calculated as $Fe_2O_3$, divided by the weight of the 12-membered ring pore zeolitic material comprising the first metal, wherein z1 preferably is in the range of from 1.0 to 10, more preferably in the range of from 1.5 to 8, more preferably in the range of from 2 to 6, more preferably in the range of from 3 to 5, more preferably in the range of from 3.5 to 4.8.

10. The catalyst of embodiment 9, wherein from 0 to 0.001 weight-%, preferably from 0 to 0.0001 weight-%, more preferably from 0 to 0.00001 weight-%, of the first metal consists of copper, calculated as CuO,
wherein the 12-membered ring pore zeolitic material contained in the first coating preferably does not comprise copper.

11. The catalyst of any one of embodiments 1 to 10, wherein from 95 to 100 weight-%, preferably from 98 to 100 weight-%, more preferably from 99 to 100 weight-% of the framework structure of the 12-membered ring pore zeolitic material consist of Si, Al, O, and optionally H, wherein in the framework structure, the molar ratio of Si to Al, calculated as molar $SiO_2$:$Al_2O_3$, preferably is in the range of from 2:1 to 37:1, more preferably in the range of from 3:1 to 35:1, more preferably in the range of from 4:1 to 20:1, more preferably in the range of from 5:1 to 15:1, more preferably in the range of from 6:1 to 12:1.

12. The catalyst of any one of embodiments 1 to 11, wherein the 12-membered ring pore zeolitic material is prepared by a template-free process.

13. The catalyst of any one of embodiments 1 to 12, wherein the first coating comprises the 12-membered ring pore zeolitic material, comprising the first metal, in an amount in the range of from 70 to 98 weight-%, preferably in the range of from 75 to 97 weight-%, more preferably in the range of from 80 to 95 weight-%, more preferably in the range of from 85 to 92 weight-%, based on the weight of the first coating.

14. The catalyst of any one of embodiments 1 to 13, wherein the first coating further comprises a 10-membered ring pore zeolitic material comprising a third metal which is one or more of copper and iron, wherein the third metal preferably is iron.

15. The catalyst of embodiment 14, wherein the 10-membered ring pore zeolitic material contained in the first coating has a framework type selected from the group consisting of MFI, MWW, AEL, HEU, FER, AFO, a mixture of two or more thereof and a mixed type of two or more thereof, wherein the 10-membered ring pore zeolitic material contained in the first coating preferably has a framework type MFI.

16. The catalyst of embodiment 14 or 15, wherein the 10-membered ring pore zeolitic material contained in the first coating comprises a third metal which is iron, wherein said 10-membered ring pore zeolitic material preferably comprises iron in an amount in the range of from 0.5 to 9 weight-%, preferably in the range of from 1 to 7 weight-%, more preferably in the range of from 1.5 to 6 weight-%, more preferably in the range of from 2 to 5 weight %, more preferably in the range of from 2.5 to 4.5 weight-%, calculated as the weight of the third metal, calculated as $Fe_2O_3$, divided by the weight of the 10-membered ring pore zeolitic material comprising the third metal.

17. The catalyst of embodiment 16, wherein from 0 to 0.001 weight-%, preferably from 0 to 0.0001 weight-%, more preferably from 0 to 0.00001 weight-%, of the third metal consists of copper, calculated as CuO, wherein the 10-membered ring pore zeolitic material contained in the first coating preferably does not comprise copper.

18. The catalyst of any one of embodiments 14 to 17, wherein from 95 to 100 weight-%, preferably from 98 to 100 weight-%, more preferably from 99 to 100 weight-% of the framework structure of the 10-membered ring pore zeolitic material consist of Si, Al, O, and optionally H, wherein in the framework structure, the molar ratio of Si to Al, calculated as molar $SiO_2$:$Al_2O_3$, is preferably in the range of from 2:1 to 60:1, more preferably in the range of from 5:1 to 50:1, more preferably in the range of from 10:1 to 40:1, more preferably in the range of from 15:1 to 35:1, more preferably in the range of from 20:1 to 30:1, more preferably in the range of from 23:1 to 29:1.

19. The catalyst of any one of embodiments 14 to 18, wherein the first coating comprises the 10-membered ring pore zeolitic material, comprising the third metal, in an amount in the range of from 1 to 8 weight-%, preferably in the range of from 2 to 7 weight-%, more preferably in the range of from 3 to 6 weight-%, based on the weight of the first coating.

20. The catalyst of any one of embodiments 1 to 19, wherein the first coating further comprises an oxidic binder, wherein the oxidic binder preferably comprises one or more of zirconia, alumina, titania, silica, and a mixed oxide comprising two or more of Zr, Al, Ti, and Si, more preferably comprises one or more of silica, alumina and zirconia, more preferably comprises one or more of silica and zirconia, more preferably silica.

21. The catalyst of embodiment 20, wherein the first coating comprises the oxidic binder in an amount in the range of from 0.5 to 8 weight-%, preferably in the range of from 2 to 7 weight-%, more preferably in the range of from 3 to 6 weight-%, based on the weight of the first coating.

22. The catalyst of any one of embodiments 1 to 21, wherein from 95 to 100 weight-%, preferably from 98 to 100 weight-%, more preferably from 99 to 100 weight-%, more preferably from 99.5 to 100 weight-% of the first coating consist of a 12-membered ring pore zeolitic material comprising the first metal which is one or more of copper and iron, and preferably one or more of the 10-membered ring pore zeolitic material comprising the third metal according to any one of embodiments 14 to 19 and the oxidic binder according to embodiment 20 or 21, more preferably the 10-membered ring pore zeolitic material comprising the third metal according to any one of embodiments 14 to 19 and the oxidic binder according to embodiment 20 or 21.

23. The catalyst of any one of embodiments 1 to 22, wherein the first coating is present in the catalyst at a loading in the range of from 1.5 to 5 g/in³, preferably in the range of from 2 to 4 g/in³, more preferably in the range of from 2.5 to 3.5 g/in³.

24. The catalyst of any one of embodiments 1 to 23, wherein at most 10 ppm, preferably from 0 to 5 ppm, more preferably from 0 to 2 ppm, more preferably from 0 to 1 ppm, more preferably from 0 to 0.5 ppm, of the first coating consists of platinum, preferably of platinum, palladium and rhodium, more preferably of any platinum group metal.

25. The catalyst of any one of embodiments 1 to 24, wherein from 0 to 0.01 weight-%, preferably from 0 to 0.001 weight-%, more preferably from 0 to 0.0001 weight-%, of the first coating consists of a 8-membered ring pore zeoltic material.

26. The catalyst of any one of embodiments 1 to 25, wherein from 0 to 0.001 weight-%, preferably from 0 to 0.0001 weight-%, more preferably from 0 to 0.00001 weight-%, of the first coating consists of copper, calculated as CuO.

27. The catalyst of any one of embodiments 1 to 26, wherein the first coating (ii) has an ammonia storage capacity $A1_{(NH3)}$ of at least 2.1 mmol/g, preferably in the range of from 2.2 to 10.0 mmol/g, more preferably in the range of from 2.5 to 5.0 mmol/g, the ammonia storage capacity being determined as defined in Reference Example 1.

28. The catalyst of any one of embodiments 1 to 27, wherein the 8-membered ring pore zeolitic material contained in the second coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, more preferably a framework type CHA.

29. The catalyst of any one of embodiments 1 to 28, wherein the 8-membered ring pore zeolitic material contained in the second coating comprises a second metal which is copper, wherein said 8-membered ring pore zeolitic material comprises copper in an amount of z2 weight-%, calculated as the weight of the second metal, calculated as CuO, divided by the weight of the 8-membered ring pore zeolitic material comprising the second metal, wherein z2 preferably is in the range of from 2.0 to 15, more preferably in the range of from 3 to 10, more preferably in the range of from 4 to 8, more preferably in the range of from 4.5 to 7, more preferably in the range of from 4.9 to 6.

30. The catalyst of embodiment 29, wherein from 0 to 0.001 weight-%, preferably from 0 to 0.0001 weight-%, more preferably from 0 to 0.00001 weight-%, of the first metal consists of iron, calculated as $Fe_2O_3$, wherein the 8-membered ring pore zeolitic material contained in the second coating preferably does not comprise iron.

31. The catalyst of any one of embodiments 1 to 30, wherein from 95 to 100 weight-%, preferably from 98 to 100 weight-%, more preferably from 99 to 100 weight-%, of the framework structure of the 8-membered ring pore zeolitic material consist of Si, Al, O, and optionally H, wherein in the framework structure, the molar ratio of Si to Al, calculated as molar $SiO_2$:$Al_2O_3$, is preferably in the range of from 2:1 to 50:1, more preferably in the range of from 2:1 to 45:1, more preferably in the range of from 10:1 to 35:1, more preferably in the range of from 15:1 to 25:1, more preferably in the range of from 16:1 to 22:1.

32. The catalyst of any one of embodiments 1 to 31, wherein the second coating comprises the 8-membered ring pore zeolitic material, comprising the second metal, in an amount in the range of from 85 to 99 weight-%, preferably in the range of from 90 to 98 weight-%, more preferably in the range of from 92 to 97 weight-%, based on the weight of the second coating.

33. The catalyst of any one of embodiments 1 to 32, wherein the second coating further comprises an oxidic binder, wherein the oxidic binder preferably comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia.

34. The catalyst of embodiment 33, wherein the second coating comprises the oxidic binder in an amount in the range of from 0.5 to 8 weight-%, preferably in the range of from 2 to 7 weight-%, more preferably in the range of from 3 to 6 weight-%, based on the weight of the first coating.

35. The catalyst of any one of embodiments 1 to 34, wherein from 95 to 100 weight-%, preferably from 98 to 100 weight-%, more preferably from 99 to 100 weight-%, more preferably from 99.5 to 100 weight-% of the second coating consist of a 8-membered ring pore zeolitic material comprising the second metal which is one or more of copper and iron, preferably copper, and preferably the oxidic binder according to embodiment 33 or 34.

36. The catalyst of any one of embodiments 1 to 35, wherein the second coating is present in the catalyst at a loading in the range of from 1.5 to 5 g/in$^3$, preferably in the range of from 1.75 to 4 g/in$^3$, more preferably in the range of from 2 to 3.5 g/in$^3$.

37. The catalyst of any one of embodiments 1 to 36, wherein at most 10 ppm, preferably from 0 to 5 ppm, more preferably from 0 to 2 ppm, more preferably from 0 to 1 ppm, more preferably from 0 to 0.5 ppm, of the second coating consists of platinum, preferably of platinum, palladium and rhodium, more preferably of any platinum group metal.

38. The catalyst of any one of embodiments 1 to 37, wherein from 0 to 0.01 weight-%, preferably from 0 to 0.001 weight-%, more preferably from 0 to 0.0001 weight-%, of the second coating consists of a 12-membered ring pore zeoltic material.

39. The catalyst of any one of embodiments 1 to 38, wherein from 0 to 0.01 weight-%, preferably from 0 to 0.001 weight-%, more preferably from 0 to 0.0001 weight-%, of the second coating consists of a 10-membered ring pore zeoltic material.

40. The catalyst of any one of embodiments 1 to 39, wherein from 0 to 0.001 weight-%, preferably from 0 to 0.0001 weight-%, more preferably from 0 to 0.00001 weight-% of the second coating consists of iron, calculated as $Fe_2O_3$.

41. The catalyst of any one of embodiments 1 to 40, wherein the second coating (iii) has an ammonia storage capacity $A2_{(NH3)}$ of less than 2 mmol/g, preferably in the range of from 0.5 to 1.99 mmol/g, more preferably in the range of from 1 to 1.95 mmol/g, the ammonia storage capacity being determined as defined in Reference Example 1.

42. The catalyst of any one of embodiments 1 to 41, wherein the substrate is a flow-through substrate or a wall-flow filter substrate, preferably a flow-through substrate.

43. The catalyst of embodiment 42, wherein the flow through substrate comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably cordierite.

44. The catalyst of any one of embodiments 1 to 43, wherein the substrate has a substrate length in the range of from 1 to 15 inches, preferably in the range of from 2 to 10 inches.

45. The catalyst of any one of embodiments 1 to 44, wherein the substrate has a substrate width in the range of from 0.5 to 3 inches, preferably in the range of from 0.75 to 2 inches.

46. The catalyst of any one of embodiments 1 to 45, wherein the catalyst comprises, preferably consists of, the substrate (i), which is one substrate, the first coating (ii) and the second coating (iii).

47. The catalyst of any one of embodiments 1 to 45, wherein the substrate comprises a first upstream substrate and a second downstream substrate, wherein the first coating (ii) is disposed on the first upstream substrate and the second coating (ii) is disposed on the second downstream substrate,
   wherein there preferably is less than 0.2 inch, more preferably no gap, between the first upstream substrate and the second downstream substrate which are juxtaposed.

48. The catalyst of any one of embodiments 1 to 47, wherein the first coating (ii) has an ammonia storage capacity $A1_{(NH3)}$ and the second coating (iii) has an ammonia storage capacity $A2_{(NH3)}$, wherein $A1_{(NH3)}$ is superior to $A2_{(NH3)}$, the ammonia storage capacity being determined as defined in Reference Example 1.

49. The catalyst of embodiment 48, wherein the ratio of $A1_{(NH3)}:A2_{(NH3)}$ is in the range of from 1.25:1 to 3:1, preferably in the range of from 1.3:1 to 2:1, more preferably in the range of from 1.35:1 to 1.9:1.

50. A process for preparing a catalyst for the selective catalytic reduction of nitrogen oxide according to any one of embodiments 1 to 49, the process comprising
   (1) providing a substrate comprising an inlet end, an outlet end, a substrate axial length extending from the inlet end to the outlet end and a plurality of passages defined by internal walls of the flow through substrate extending therethrough;
   (2) preparing a first mixture comprising water and a 12-membered ring pore zeolitic material comprising a first metal which is one or more of copper and iron, wherein said 12-membered ring pore zeolitic material comprises said first metal in an amount of z1 weight-%, calculated as the weight of the first metal, calculated as CuO and $Fe_2O_3$, divided by the weight of the 12-membered ring pore zeolitic material comprising the first metal;
   (3) disposing the first mixture obtained in (2) on the surface of the internal walls of the substrate provided in (1), over x % of the substrate axial length from the inlet end toward the outlet end of the substrate, wherein x is in the range of from 10 to 75;
(4) drying the mixture-treated substrate obtained in (3), obtaining the substrate having a first coating disposed thereon; optionally calcining;
(5) preparing a second mixture comprising water and a 8-membered ring pore zeolitic material comprising a second metal which is one or more of copper and iron, wherein said 8-membered ring pore zeolitic material comprises said second metal in an amount of z2 weight-%, calculated as the weight of the second metal, calculated as CuO and $Fe_2O_3$, divided by the weight of the 8-membered ring pore zeolitic material comprising the second metal;
(6) disposing the second mixture obtained in (5) on the substrate having a first coating disposed thereon obtained in (4) over y % of the substrate axial length from the outlet end toward the inlet end of the substrate, wherein y is in the range of from 25 to 90;
(7) drying the mixture-treated substrate obtained in (6), obtaining the substrate having a first coating and a second coating disposed thereon;
(8) calcining the substrate having a first coating and a second coating disposed thereon obtained in (7), obtaining the catalyst;
wherein the ratio z1:z2 is in the range of from 0.5:1 to 0.95:1.

51. The process of embodiment 50, wherein (2) further comprises
(2.1) preparing a 12-membered ring pore zeolitic material, preferably the 12-membered ring pore zeolitic material as defined in any one of embodiments 8 to 12;
(2.2) mixing a source of a first metal, preferably an iron salt, with the 12-membered ring pore zeolitic material obtained in (2.1);
(2.3) calcining the mixture obtained in (2.2), obtaining a 12-membered ring pore zeolitic material comprising the first metal, preferably comprising iron;
(2.4) admixing water and the 12-membered ring pore zeolitic material comprising the first metal, preferably comprising iron, and preferably an organic acid, more preferably tartaric acid.

52. The process of embodiment 51, wherein (2) further comprises
(2.5) adding a 10-membered ring pore zeolitic material comprising a third metal to the mixture obtained in (2.4), preferably the 10-membered ring pore zeolitic material as defined in any one of embodiments 15 to 18;
(2.6) preferably adding a source of an oxidic binder, preferably colloidal silica, to the mixture obtained in (2.5);
(2.7) more preferably adding an additive to the mixture obtained in (2.6).

53. The process of any one of embodiments 50 to 52, wherein drying according to (4) is performed in a gas atmosphere having a temperature in the range of from 100 to 160° C., preferably in the range of from 120 to 140° C., the gas atmosphere preferably comprising oxygen, more preferably being air.

54. The process of any one of embodiments 50 to 53, wherein drying according to (4) is performed for a duration in the range of from 5 minutes to 2 hours, preferably in the range of from 10 minutes to 1 hour.

55. The process of any one of embodiments 50 to 54, wherein, after drying, calcining according to (4) is performed in a gas atmosphere having a temperature in the range of from 450 to 700° C., preferably in the range of from 500 to 600° C., the gas atmosphere preferably comprising oxygen, more preferably being air.

56. The process of any one of embodiments 50 to 55, wherein, after drying, calcining according to (4) is performed for a duration in the range of from 5 minutes to 2 hours, preferably in the range of from 10 minutes to 1 hour.

57. The process of any one of embodiments 50 to 56, wherein (5) comprises
(5.1) preparing a 8-membered ring pore zeolitic material comprising a second metal which is one or more of copper and iron, preferably copper, preferably the 8-membered ring pore zeolitic material is as defined in any one of embodiments 28 to 31;
(5.2) admixing water and the 8-membered ring pore zeolitic material comprising a second metal which is one or more of copper and iron, preferably copper, obtained in (5.1);
(5.3) adding a source of an oxidic binder, preferably zirconium acetate, to the mixture obtained in (5.2).

58. The process of any one of embodiments 50 to 57, wherein drying according to (7) is performed in a gas atmosphere having a temperature in the range of from 100 to 160° C., preferably in the range of from 120 to 140° C., the gas atmosphere preferably comprising oxygen, more preferably being air.

59. The process of any one of embodiments 50 to 58, wherein drying according to (7) is performed for a duration in the range of from 5 minutes to 2 hours, preferably in the range of from 10 minutes to 1 hour.

60. The process of any one of embodiments 50 to 59, wherein, after drying, calcining according to (7) is performed in a gas atmosphere having a temperature in the range of from 400 to 600° C., preferably in the range of from 450 to 550° C., the gas atmosphere preferably comprising oxygen, more preferably being air.

61. The process of any one of embodiments 50 to 60, wherein, after drying, calcining according to (7) is performed for a duration in the range of from 5 minutes to 2 hours, preferably in the range of from 10 minutes to 1 hour.

62. The process of any one of embodiments 50 to 61, wherein x is in the range of from 20 to 72, preferably in the range of from 22 to 70, more preferably in the range of from 25 to 68.

63. The process of any one of embodiments 50 to 62, wherein y is in the range of from 27 to 80, preferably in the range of from 30 to 78, more preferably in the range of from 32 to 75.

64. The process of any one of embodiments 50 to 63, wherein y is 100−x.

65. The process of any one of embodiments 50 to 64, wherein the second coating is disposed on the surface of the internal walls of the substrate.

66. The process of any one of embodiments 50 to 65, wherein x<y, wherein x is in the range of 10 to 45, preferably in the range of from 20 to 40, more preferably in the range of from 25 to 35; or
wherein x>y, wherein x is in the range of 55 to 75, preferably in the range of from 60 to 72, more preferably in the range of from 62 to 70, more preferably in the range of from 63 to 68.

67. The process of any one of embodiments 50 to 66, wherein there is no overlap of the first coating and the second coating.
68. The process of any one of embodiments 50 to 68, consisting of (1), (2), (3), (4), (5), (6) and (7).
69. A catalyst for the selective catalytic reduction of nitrogen oxide, preferably a catalyst for the selective catalytic reduction of nitrogen oxide according to any one of embodiments 1 to 49, obtainable or obtained by a process according to any one of embodiments 50 to 68.
70. An exhaust gas treatment system for treating an exhaust gas exiting from a combustion engine, preferably a diesel engine, the system comprising one or more catalysts for the selective catalytic reduction of nitrogen oxide according to any one of embodiments 1 to 49 and 69, and one or more of a diesel oxidation catalyst, a catalyzed soot filter and an ammonia oxidation catalyst.
71. The system of embodiment 70, wherein the system comprises a diesel oxidation catalyst, a catalyzed soot filter and one or more catalysts for the selective catalytic reduction of nitrogen oxide according to any one of embodiments 1 to 49 and 69,
wherein the diesel oxidation catalyst is positioned upstream of the catalyzed soot filter,
wherein the catalyzed sot filter is positioned upstream of the one or more catalysts for the selective catalytic reduction of nitrogen oxide according to any one of embodiments 1 to 49 and 69.
72. The system of embodiment 71, wherein the catalyzed soot filter is positioned upstream of two catalysts for the selective catalytic reduction of nitrogen oxide according to any one of embodiments 1 to 49 and 69, wherein the two catalysts for the selective catalytic reduction of nitrogen oxide are positioned parallel to each other.
73. The system of embodiment 72, further comprising two ammonia oxidation catalysts, wherein each ammonia oxidation catalyst is positioned downstream of one catalyst for the selective catalytic reduction of nitrogen oxide according to any one of embodiments 1 to 49 and 69.
74. The system of embodiment 70, wherein the system comprises the catalyst for the selective catalytic reduction of nitrogen oxide according to any one of embodiments 1 to 49 and 69 and a catalyzed soot filter,
wherein the catalyzed soot filter is positioned downstream of the catalyst for the selective catalytic reduction of nitrogen oxide according to any one of embodiments 1 to 49 and 69.
75. The system of embodiment 74, further comprising a diesel oxidation catalyst, wherein the diesel oxidation catalyst is positioned downstream of the catalyst for the selective catalytic reduction of nitrogen oxide according to any one of embodiments 1 to 49 and 69 and upstream of the catalyzed soot filter,
wherein the system preferably further comprises an ammonia oxidation catalyst which is positioned downstream of the catalyzed particulate filter.
76. Use of a catalyst according to any one of embodiments 1 to 49 and 69 for the selective catalytic reduction of nitrogen oxide comprised in an exhaust gas stream, preferably from a diesel engine.
77. Use of the exhaust gas treatment system according to any one of embodiments 70 to 75 for the treatment of an exhaust gas stream from a diesel engine.
78. A method for selectively catalytically reducing NOx, wherein the NOx are comprised in an exhaust gas stream, said method comprising
(1) providing the exhaust gas stream, preferably from a diesel engine;
(2) passing the exhaust gas stream provided in (1) through the catalyst according to any one of embodiments 1 to 49 and 69.
79. A method for treating an exhaust gas stream from a diesel engine, said method comprising
(1') providing said exhaust gas stream;
(2') passing the exhaust gas stream provided in (1') through the exhaust gas treatment system according to any one of embodiments 70 to 75.

The present invention is illustrated by the following second set of embodiments and combinations of embodiments resulting from the dependencies and back-references as indicated. The second set of embodiments may be combined with the first set of embodiments below. In particular, it is noted that in each instance where a range of embodiments is mentioned, for example in the context of a term such as "The catalyst of any one of embodiments 1' to 3'", every embodiment in this range is meant to be explicitly disclosed for the skilled person, i.e. the wording of this term is to be understood by the skilled person as being synonymous to "The catalyst of any one of embodiments 1', 2' and 3'". Further, it is explicitly noted that the following set of embodiments is not the set of claims determining the extent of protection, but represents a suitably structured part of the description directed to general and preferred aspects of the present invention.

1'. A catalyst for the selective catalytic reduction of nitrogen oxide, the catalyst comprising a substrate comprising an inlet end, an outlet end, a substrate axial length extending from the inlet end to the outlet end and a plurality of passages defined by internal walls of the flow through substrate extending therethrough;
a coating disposed on the surface of the internal walls of the substrate, which surface defines the interface between the internal walls and the passages, the coating comprising a 12-membered ring pore zeolitic material comprising a first metal which is one or more of copper and iron, wherein said 12-membered ring pore zeolitic material comprises said first metal in an amount of z weight-%, calculated as the weight of the first metal, calculated as CuO and $Fe_2O_3$, divided by the weight of the 12-membered ring pore zeolitic material comprising the first metal and
wherein the coating further comprises a 10-membered ring pore zeolitic material comprising a second metal which is one or more of copper and iron, wherein said 10-membered ring pore zeolitic material comprises said second metal in an amount of y weight-%, calculated as the weight of the second metal, calculated as CuO and $Fe_2O_3$, divided by the weight of the 10-membered ring pore zeolitic material comprising the second metal;
wherein y is in the range of from 0.5 to 9 and wherein y<z.
2'. The catalyst of embodiment 1', wherein the coating extends over 90 to 100%, preferably over 95 to 100%, more preferably over 98 to 100% of the substrate axial length.
3'. The catalyst of embodiment 1' or 2', wherein the 12-membered ring pore zeolitic material contained in the coating has a framework type selected from the group consisting of BEA, FAU, USY, GME, MOR, OFF, a mixture of two or more thereof and a mixed type of two or more thereof, preferably selected from the group consisting of BEA, FAU, a mixture of two or more thereof and a mixed type of two or more thereof, more preferably a framework type BEA.

4'. The catalyst of any one of embodiments 1' to 3', wherein the 12-membered ring pore zeolitic material contained in the coating comprises a first metal which is iron, wherein said 12-membered ring pore zeolitic material comprises iron in an amount of z weight-%, calculated as the weight of the first metal, calculated as $Fe_2O_3$, divided by the weight of the 12-membered ring pore zeolitic material comprising the first metal, wherein z preferably is in the range of from 1.0 to 10, more preferably in the range of from 1.5 to 8, more preferably in the range of from 2 to 6, more preferably in the range of from 3 to 5, more preferably in the range of from 3.5 to 4.8.

5'. The catalyst of embodiment 4', wherein from 0 to 0.001 weight-%, preferably from 0 to 0.0001 weight-%, more preferably from 0 to 0.00001 weight-%, of the first metal consists of copper, calculated as CuO,
wherein the 12-membered ring pore zeolitic material contained in the coating preferably does not comprise copper.

6'. The catalyst of any one of embodiments 1' to 5', wherein from 95 to 100 weight-%, preferably from 98 to 100 weight-%, more preferably from 99 to 100 weight-% of the framework structure of the 12-membered ring pore zeolitic material consist of Si, Al, O, and optionally H, wherein in the framework structure, the molar ratio of Si to Al, calculated as molar $SiO_2$:$Al_2O_3$, is preferably in the range of from 2:1 to 37:1, more preferably in the range of from 3:1 to 35:1, more preferably in the range of from 4:1 to 20:1, more preferably in the range of from 5:1 to 15:1, more preferably in the range of from 6:1 to 12:1.

7'. The catalyst of any one of embodiments 1' to 6', wherein the 12-membered ring pore zeolitic material is prepared by a template-free process.

8'. The catalyst of any one of embodiments 1' to 7', wherein the coating comprises the 12-membered ring pore zeolitic material comprising the first metal in an amount in the range of from 70 to 98 weight-%, preferably in the range of from 75 to 97 weight-%, more preferably in the range of from 80 to 95 weight-%, more preferably in the range of from 85 to 92 weight-%, based on the weight of the coating.

9'. The catalyst of any one of embodiments 1' to 8', wherein the 10-membered ring pore zeolitic material comprising a second metal which is iron.

10'. The catalyst of any one of embodiments 1' to 9', wherein the 10-membered ring pore zeolitic material comprised in the coating has a framework type selected from the group consisting of MFI, MWW, AEL, HEU, FER, AFO, a mixture of two or more thereof and a mixed type of two or more thereof, wherein the 10-membered ring pore zeolitic material comprised in the coating preferably has a framework type MFI.

11'. The catalyst of any one of embodiments 1' to 10', wherein the 10-membered ring pore zeolitic material contained in the coating comprises a second metal which is iron, wherein said 10-membered ring pore zeolitic material comprises iron in an amount of y weight-%, calculated as the weight of the second metal, calculated as $Fe_2O_3$, divided by the weight of the 10-membered ring pore zeolitic material comprising the second metal, wherein y preferably is in the range of from 1 to 7, preferably in the range of from 1.5 to 6, more preferably in the range of from 2 to 5, more preferably in the range of from 2.5 to 4.5.

12'. The catalyst of embodiment 11', wherein from 0 to 0.001 weight-%, preferably from 0 to 0.0001 weight-%, more preferably from 0 to 0.00001 weight-%, of the second metal consists of copper, calculated as CuO,
wherein the 10-membered ring pore zeolitic material contained in the coating preferably does not comprise copper.

13'. The catalyst of any one of embodiments 1' to 12', wherein from 95 to 100 weight-%, preferably from 98 to 100 weight-%, more preferably from 99 to 100 weight-% of the framework structure of the 10-membered ring pore zeolitic material consist of Si, Al, O, and optionally H, wherein in the framework structure, the molar ratio of Si to Al, calculated as molar $SiO_2$:$Al_2O_3$, is preferably in the range of from 2:1 to 60:1, more preferably in the range of from 5:1 to 50:1, more preferably in the range of from 10:1 to 40:1, more preferably in the range of from 15:1 to 35:1, more preferably in the range of from 20:1 to 30:1, more preferably in the range of from 23:1 to 29:1.

14'. The catalyst of any one of embodiments 1' to 13', wherein the coating comprises the 10-membered ring pore zeolitic material comprising the second metal in an amount in the range of from 1 to 8 weight-%, preferably in the range of from 2 to 7 weight-%, more preferably in the range of from 3 to 6 weight-%, based on the weight of the coating.

15'. The catalyst of any one of embodiments 1' to 14', wherein the coating further comprises an oxidic binder, wherein the oxidic binder preferably comprises one or more of zirconia, alumina, titania, silica, and a mixed oxide comprising two or more of Zr, Al, Ti, and Si, more preferably comprises one or more of silica, alumina and zirconia, more preferably comprises one or more of silica and zirconia, more preferably silica;
wherein the coating preferably comprises the oxidic binder in an amount in the range of from 0.5 to 8 weight-%, more preferably in the range of from 2 to 7 weight-%, more preferably in the range of from 3 to 6 weight-%, based on the weight of the coating.

16'. The catalyst of any one of embodiments 1' to 15', wherein from 95 to 100 weight-%, preferably from 98 to 100 weight-%, more preferably from 99 to 100 weight-%, more preferably from 99.5 to 100 weight-% of the coating consist of a 12-membered ring pore zeolitic material comprising the first metal which is one or more of copper and iron, preferably iron, the 10-membered ring pore zeolitic material comprising the second metal which is one or more of copper and iron, preferably iron, and preferably the oxidic binder according to embodiment 15'.

17'. The catalyst of any one of embodiments 1' to 16', wherein the coating is present in the catalyst at a loading in the range of from 1.5 to 5 $g/in^3$, preferably in the range of from 2 to 4 $g/in^3$, more preferably in the range of from 2.5 to 3.5 $g/in^3$.

18'. The catalyst of any one of embodiments 1' to 17', wherein at most 10 ppm, preferably from 0 to 5 ppm, more preferably from 0 to 2 ppm, more preferably from 0 to 1 ppm, more preferably from 0 to 0.5 ppm, of the coating consist of platinum, preferably of platinum, palladium and rhodium, more preferably of any platinum group metal.

19'. The catalyst of any one of embodiments 1' to 18', wherein from 0 to 0.01 weight-%, preferably from 0 to 0.001 weight-%, more preferably from 0 to 0.0001 weight-%, of the coating consists of a 8-membered ring pore zeoltic material.

20'. The catalyst of any one of embodiments 1' to 19', wherein from 0 to 0.001 weight-%, preferably from 0 to 0.0001 weight-%, more preferably from 0 to 0.00001 weight-%, of the coating consists of copper, calculated as CuO.

21'. The catalyst of any one of embodiments 1' to 20', wherein the coating has an ammonia storage capacity $Al_{(NH3)}$ of at least 2.1 mmol/g, preferably in the range of from 2.2 to 10.0 mmol/g, more preferably in the range of from 2.5 to 5.0 mmol/g, the ammonia storage capacity being determined as defined in Reference Example 1.

22'. The catalyst of any one of embodiments 1' to 21', consisting of the substrate and the coating.

23'. A process for preparing the catalyst according to any one of embodiments 1' to 22', the process comprising
(1') providing a substrate comprising an inlet end, an outlet end, a substrate axial length extending from the inlet end to the outlet end and a plurality of passages defined by internal walls of the flow through substrate extending therethrough;
(2') preparing a mixture comprising water, a 12-membered ring pore zeolitic material comprising a first metal which is one or more of copper and iron, wherein said 12-membered ring pore zeolitic material comprises said first metal in an amount of z weight-%, calculated as the weight of the first metal, calculated as CuO and $Fe_2O_3$, divided by the weight of the 12-membered ring pore zeolitic material comprising the first metal and the mixture further comprising a 10-membered ring pore zeolitic material comprising a second metal which is one or more of copper and iron, wherein said 10-membered ring pore zeolitic material comprises said second metal in an amount of y weight-%, calculated as the weight of the second metal, calculated as CuO and $Fe_2O_3$, divided by the weight of the 10-membered ring pore zeolitic material comprising the second metal;
(3') disposing the mixture obtained in (2') on the surface of the internal walls of the substrate provided in (1'), over x % of the substrate axial length from the inlet end toward the outlet end of the substrate, wherein x is in the range of from 10 to 75;
(4') drying the mixture-treated substrate obtained in (3'), obtaining the substrate having a coating disposed thereon;
(5') calcining the substrate having a coating disposed thereon obtained in (4'), obtaining the catalyst;
wherein y is in the range of from 0.5 to 9 and wherein y<z.

24'. The process of embodiment 23', wherein (2') further comprises
(2'.1) preparing a 12-membered ring pore zeolitic material, preferably the 12-membered ring pore zeolitic material as defined in any one of embodiments 3' to 7';
(2'.2) mixing a source of a first metal, preferably an iron salt, with the 12-membered ring pore zeolitic material obtained in (2'.1);
(2'.3) calcining the mixture obtained in (2'.2), obtaining a 12-membered ring pore zeolitic material comprising the first metal, preferably comprising iron;
(2'.4) admixing water and the 12-membered ring pore zeolitic material comprising the first metal, preferably comprising iron, and preferably an organic acid, more preferably tartaric acid;
(2'.5) adding a 10-membered ring pore zeolitic material comprising a second metal to the mixture obtained in (2'.4), preferably the 10-membered ring pore zeolitic material as defined in any one of embodiments 10' to 13';
(2'.6) preferably adding a source of an oxidic binder, preferably colloidal silica, to the mixture obtained in (2'.5);
(2'.7) more preferably adding an additive to the mixture obtained in (2'.6).

25'. The process of embodiment 23' or 24', wherein drying according to (4') is performed in a gas atmosphere having a temperature in the range of from 100 to 160° C., preferably in the range of from 120 to 140° C., the gas atmosphere preferably comprising oxygen, more preferably being air.

26'. The process of any one of embodiments 23' to 25', wherein drying according to (4') is performed for a duration in the range of from 5 minutes to 2 hours, preferably in the range of from 10 minutes to 1 hour.

27'. The process of any one of embodiments 23' to 26', wherein calcining according to (5') is performed in a gas atmosphere having a temperature in the range of from 450 to 700° C., preferably in the range of from 500 to 600° C., the gas atmosphere preferably comprising oxygen, more preferably being air.

28'. The process of any one of embodiments 23' to 27', wherein calcining according to (5') is performed for a duration in the range of from 5 minutes to 2 hours, preferably in the range of from 10 minutes to 1 hour.

29'. The process of any one of embodiments 23' to 28', consisting of (1'), (2'), (3'), (4') and (5').

30'. A catalyst for the selective catalytic reduction of nitrogen oxide, preferably a catalyst for the selective catalytic reduction of nitrogen oxide according to any one of embodiments 1' to 22', obtainable or obtained by a process according to any one of embodiments 23' to 28'.

31'. A catalyst for the selective catalytic reduction of nitrogen oxide comprising
a first catalyst for the selective catalytic reduction of nitrogen oxide according to any one of embodiments 1' to 22'; and
a second catalyst for the selective catalytic reduction of nitrogen oxide comprising
a substrate comprising an inlet end, an outlet end, a substrate axial length extending from the inlet end to the outlet end and a plurality of passages defined by internal walls of the flow through substrate extending therethrough;
a coating disposed on the surface of the internal walls of the substrate, wherein the coating is the second coating (iii) defined in the first set of embodiments;
wherein the coating of the catalyst for the selective catalytic reduction of nitrogen oxide according to any one of embodiments 1' to 22' preferably is the first coating (ii) defined in the first set of embodiments;
wherein the first catalyst is disposed upstream of the second catalyst and wherein there preferably is less than 0.2 inch, more preferably no gap, between the substrate of the first catalyst and the substrate of the second catalyst which are juxtaposed.

In the context of the present invention, the term "loading of a given component/coating" (in $g/in^3$ or $g/ft^3$) refers to the mass of said component/coating per volume of the substrate, wherein the volume of the substrate is the volume which is defined by the cross-section of the substrate times the axial length of the substrate over which said component/coating is present. For example, if reference is made to the loading of a first coating extending over x % of the axial length of the substrate and having a loading of X $g/in^3$, said loading would refer to X gram of the first coating per x % of the volume (in $in^3$) of the entire substrate.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

In the context of the present invention, the term "consists of" with regard to the weight-% of one or more components indicates the weight-% amount of said component(s) based on 100 weight-% of the entity in question. For example, the wording "wherein from 0 to 0.001 weight-% of the first coating consists of platinum" indicates that among the 100 weight-% of the components of which said coating consists of, 0 to 0.001 weight-% is platinum.

The present invention is further illustrated by the following reference examples, comparative examples and examples.

EXAMPLES

Reference Example 1: Ammonia Storage Capacity Measurement

The ammonia storage capacity that a given catalyst may have was measured by Thermal Gravimetric Analysis (TGA) as defined in the U.S. Pat. No. 9,597,639 B2.

Reference Example 2: Determination of the Volume-Based Particle Size Distributions (Dv90)

The particle size distributions were determined by a static light scattering method using Sympatec HELOS (3200) & QUIXEL equipment, wherein the optical concentration of the sample was below 10%.

Reference Example 3: BET Specific Surface Area Measurement

The BET specific surface area was determined according to DIN 66131 or DIN ISO 9277 using liquid nitrogen.

Reference Example 4: Coating Method

In order to coat the flow-through substrate with one or more coatings, the flow-through substrate was suitably immersed vertically in a portion of a given slurry for a specific length of the substrate which was equal to the targeted length of the coating to be applied. In this manner, the slurry contacted the walls of the substrate.

Reference Example 6: Preparation of a Selective Catalytic Reduction (SCR) Catalyst (Fe-BEA Containing)

Slurry Preparation:

A Fe-BEA with a Fe content of 1.55 weight-%, calculated as $Fe_2O_3$, based on the weight of the Fe-BEA (Dv90 of 5.15 micrometers, a $SiO_2:Al_2O_3$ molar ratio of 39 and a BET specific surface area of about 700 $m^2/g$) was dispersed in a solution of water and tartaric acid (1.3 weight-% of tartaric based on the weight of Fe-BEA) forming a slurry. The BEA zeolite was prepared by a synthesis route using a template. The resulting slurry was milled using a continuous milling apparatus so that the Dv90 value of the particles was of about 5 micrometers.

A Fe-MFI with a Fe content of 3.5 weight-%, calculated as $Fe_2O_3$, based on the weight of the Fe-MFI (Dv90 of 17.5 micrometers, a $SiO_2:Al_2O_3$ molar ratio of 27.5 and a BET specific surface area of about 385 $m^2/g$) was added to the Fe-BEA containing slurry. The amount of Fe-MFI was calculated such that it was about 5.5 weight-% based on the weight of the Fe-BEA. Further, a binder, colloidal silica, was added to the mixture. The amount of colloidal silica was calculated such that it was about 5.4 weight-% based on the weight of Fe-BEA. Finally, a viscosity agent (0.13 weight-% based on the weight of Fe-BEA) was added. The resulting slurry was mixed and milled using a continuous milling apparatus so that the Dv90 value of the particles was of about 5 micrometers. The pH of the aqueous phase of the slurry was measured and adjusted to about 3-3.5 and the solid content of said slurry was of 44 weight-%.

An uncoated honeycomb flow-through monolith cordierite substrate (diameter: 1 inch x length: 2 inches, cylindrically shaped with 300 cells per square inch and 5 mill wall thickness) was coated with the obtained slurry over 100% of the substrate length according to the method described in Reference Example 4. The coated substrate was dried at 140° C. for 30 minutes and calcined in air at 590° C. for about 30 minutes (coating/drying and calcining were repeated once). The final loading of the coating in the catalyst after calcination is of about 3.2 $g/in^3$, including 2.88 $g/in^3$ of Fe-BEA, 0.16 $g/in^3$ of Fe-MFI and 0.1562 $g/in^3$ of silica. The ammonia storage capacity of the coating measured according to Reference Example 1 was 1.2 mmol/g.

Reference Example 7: Preparation of a SCR Catalyst (Cu-CHA Containing)

An aqueous zirconium acetate solution was added to water. The amount of zirconium acetate was calculated such that the amount of zirconia in the coating, calculated as $ZrO_2$, was 5 weight-% based on the weight of the Cu- Chabazite. Further, a Cu-Chabazite with a Cu content of 5.1 weight-%, calculated as CuO, based on the weight of the Chabazite (a $SiO_2:Al_2O_3$ molar ratio of 18 and a BET specific surface area of about 565 m$^2$/g) was added to the solution with zirconium acetate to form a mixture having a solid content of 46 weight-%. Water was added and the resulting slurry was milled using a continuous milling apparatus so that the Dv90 value of the particles was of about 7 micrometers. Further, a dispersant was added as well as an acid to obtain a pH of the aqueous phase of the obtained slurry of 4. The solid content of said slurry was adjusted by adding water to a value of 40 weight-%.

An uncoated honeycomb flow-through monolith cordierite substrate (diameter: 1 inch x length: 1 inch, cylindrically shaped with 600 cells per square inch and 3 mil wall thickness) was coated with the obtained slurry over 100% of the substrate length according to the method described in Reference Example 4. The coated substrate was dried at 140° C. for 30 minutes and calcined in air at 450° C. for 30 minutes. The final loading of the coating in the catalyst after calcination is of about 2.75 g/in$^3$, including 2.62 g/in$^3$ of Cu-CHA, 0.13 g/in$^3$ of $ZrO_2$. The ammonia storage capacity of the coating measured according to Reference Example 1 was 1.9 mmol/g.

Example 1: Preparation of a SCR Catalyst

Slurry Preparation:

A Fe-BEA with a Fe content of 4.6 weight-%, calculated as $Fe_2O_3$, based on the weight of the Fe-BEA (Dv90 of about 13.5 micrometers, a $SiO_2:Al_2O_3$ molar ratio of 9.75 and a BET specific surface area of about 612.5 m$^2$/g) was dispersed in a solution of water and tartaric acid (1.3 weight-% based on the weight of Fe-BEA) forming a slurry. The BEA zeolite was prepared by a template-free synthesis. The resulting slurry was milled using a continuous milling apparatus so that the Dv90 value of the particles was of about 5 micrometers.

A Fe-MFI with a Fe content of 3.5 weight-%, calculated as $Fe_2O_3$, based on the weight of the Fe-MFI (Dv90 of 17.5 micrometers, a $SiO_2:Al_2O_3$ molar ratio of 27.5 and a BET specific surface area of about 385 m$^2$/g) was added to the Fe-BEA containing slurry. The amount of Fe-MFI was calculated such that it was about 5.5 weight-% based on the weight of the Fe-BEA. Further, a binder, colloidal silica, was added to the mixture. The amount of colloidal silica was calculated such that it was about 5.4 weight-% based on the weight of Fe-BEA. Finally, a viscosity agent (0.13 weight-% based on the weight of Fe-BEA) was added. The resulting slurry was mixed and milled using a continuous milling apparatus so that the Dv90 value of the particles was of about 5 micrometers. The pH of the aqueous phase of the slurry was measured and adjusted to about 3-3.5 and the solid content of said slurry was of 39 weight-%.

a) An uncoated honeycomb flow-through monolith cordierite substrate (diameter: 1 inch x length: 2 inches, cylindrically shaped with 600 cells per square inch and 3 mil wall thickness) was coated with the obtained slurry over 100% of the substrate length according to the method described in Reference Example 4. The coated substrate was dried at 140° C. for 30 minutes and calcined in air at 590° C. for 30 minutes (coating/drying and calcining were repeated once or maximum twice to attain the targeted loading below).

The final loading of the coating in the catalyst after calcination is of about 3.2 g/in$^3$, including 2.88 g/in$^3$ of Fe-BEA, 0.16 g/in$^3$ of Fe-MFI and 0.1562 g/in$^3$ of silica. The ammonia storage capacity of the coating measured according to Reference Example 1 was 2.8-3.0 mmol/g.

b) An uncoated honeycomb flow-through monolith cordierite substrate (diameter: 1 inch x length: 2 inches, cylindrically shaped with 300 cells per square inch and 5 mil wall thickness) was coated with the obtained slurry over 100% of the substrate length according to the method described in Reference Example 4. The coated substrate was dried at 140° C. for 30 minutes and calcined in air at 590° C. for 30 minutes (coating/drying and calcining were repeated once or maximum twice to attain the targeted loading below).

The final loading of the coating in the catalyst after calcination is of about 3.2 g/in$^3$, including 2.88 g/in$^3$ of Fe-BEA, 0.16 g/in$^3$ of Fe-MFI and 0.1562 g/in$^3$ of silica. The ammonia storage capacity of the coating measured according to Reference Example 1 was 2.8-3.0 mmol/g.

Example 2: Testing of the Catalysts of Example 1 a) and Reference Example 6—DeNOx Performance and N$_2$O Formation The Catalysts of Example 1 a) and of Reference Example 6 were hydrothermally aged in an oven at 650° C. for 25 hours. The deNOx (%) and the N$_2$O (nitrous oxide) formation (in ppm) were measured when using the catalysts of Example 1 a) and of Reference Example 6—E-lab evaluation.

Space Velocity: 60000 h$^{-1}$

NOx=NO inlet concentration: 500 ppm/NH$_3$ inlet concentration: 550 ppm/H$_2$O: 10 vol.-%/O$_2$: 10 vol.-%

Test Temperatures: 450, 400, 350, 300, 250, 225, 200, 180 and 150° C.

General Test Procedure for Lab Reactor Evaluation:

1. Adjust maximum test temperature and feed gas composition
2. Allow to stabilize the concentrations measured behind the catalyst under investigation
3. Determine the NOx, NH$_3$ and N$_2$O concentrations at the catalyst outlet and use the inlet concentrations either from Bypass measurements or from the reactor setup measurements
4. Go to the next lower temperature and repeat step 2 and 3.

Calculations:

DeNOx: (NOxIn−NOxOut)/NOxIn*100 Unit: Percent

N$_2$O make: N$_2$OOut−N$_2$OIn Unit: ppm

The results are illustrated on FIGS. 1 and 2.

As may be taken from FIGS. 1 and 2, the catalyst of Example 1 a) exhibits a T$_{50}$ (deNOx) of about 250° C. and a NOx conversion of about 98% at 450° C. while presenting very low nitrous oxide formation, or only minor nitrous oxide formation of less than 0.5 ppm N$_2$O, in a temperature of from 150 to 450° C. In contrast thereto, the catalyst of Reference Example 6 discloses a lower NOx conversion under the same conditions. Thus, said example shows that the catalyst of the present invention permits to improve the NOx conversion while exhibiting a low N$_2$O formation.

Example 3: Measurement of the Ammonia Storage Capacity for Example 1 a), of Reference Examples 6 and 7

The ammonia storage capacity of the coatings of these catalyst were measured as defined in Reference Example 1 under fresh conditions. In particular, the measurements were made on the powders comprising the components of each coating. The results are displayed in Table 1 below.

TABLE 1

Ammonia storage capacity (fresh conditions)

| | Ammonia storage capacity (mmol/g) |
|---|---|
| Example 1 | 2.8-3.0 |
| Ref. Example 6 | 1.2 |
| Ref. Example 7 | 1.9 |

As may be taken from Table 1, the Fe-BEA catalyst of Example 1 a) shows a much higher ammonia storage capacity compared to the Fe-BEA catalyst of Reference Example 6 (prior art). Thus, without wanting to be bound to any theory it is believed that the silica to alumina ratio of a BEA zeolitic material and the amount of Fe have an impact on the ammonia storage capacity of a Fe-BEA catalyst. Further, without wanting to be bound to any theory it is believed that the process for preparing a BEA zeolitic material, namely a template-free process for preparing a BEA zeolitic material, also has an influence on the ammonia storage capacity of the final catalyst. Further, the Fe-BEA catalyst of Example 1 a) also exhibits a much higher ammonia storage capacity compared to the Cu-CHA catalyst of Reference Example 7.

Example 4: A SCR Catalyst Comprising the Catalysts of Example 1 b) and of Reference Example 7

A SCR catalyst was prepared by combining the catalyst of Example 1 b) and the catalyst of Reference Example 7, in a manner that the catalyst of Example 1 b) is upstream of the catalyst of Reference Example 7 and the catalyst of Reference Example 7 is downstream of the catalyst of Example 1 b) and wherein there is no gap between the two catalysts. The formed catalyst had a length of 3 inches (2 inches—Example 1b)—and 1 inch—Reference Example 7).

Thus, the upstream portion of the catalyst of Example 4 made of the catalyst of Example 1 b) had an ammonia storage capacity of 2.8-3.0 mmol/g and the downstream portion of the catalyst of Example 4 made of the catalyst of Reference Example 7 had an ammonia storage capacity of 1.9 mmol/g, the ammonia storage capacity being determined as defined in Reference Example 1. The ammonia storage capacity in the upstream zone of the catalyst of Example 4 was higher than in the downstream zone of said catalyst.

Comparative Example 1: A SCR Catalyst Comprising the Catalysts of Reference Example 6 and of Reference Example 7

A SCR catalyst was prepared by combining the catalyst of Reference Example 6 and the catalyst of Reference Example 7, in a manner that the catalyst of Reference Example 6 is upstream of the catalyst of Reference Example 7 and the catalyst of Reference Example 7 is downstream of the catalyst of Reference Example 6 and wherein there is no gap between the two catalysts. The formed catalyst had a length of 3 inches (2 inches—Reference Example 6—and 1 inch—Reference Example 7).

Thus, the upstream portion of the catalyst of Comparative Example 1 made of the catalyst of Reference Example 6 had an ammonia storage capacity of 1.2 mmol/g and the downstream portion of the catalyst of Comparative Example 1 made of the catalyst of Reference Example 7 had an ammonia storage capacity of 1.9 mmol/g, the ammonia storage capacity being determined as defined in Reference Example 1. The ammonia storage capacity of the catalyst of Comparative Example 1 is higher in the downstream zone than in the upstream zone. This example is representative of the prior art U.S. Pat. No. 9,597,636 B2, wherein it is disclosed that the ammonia storage capacity has to be higher in the downstream portion of the catalyst.

Example 5: Testing of the Catalysts of Example 4 and of Comparative Example 1—NOx Emissions A selective catalytic reduction (SCR) steady state was performed with ramps $$(C_{NOx} = C_{NO}(\text{feed}) = 750 \text{ ppm},$$

NSR (Normalized Stoichiometric Ratio) of ammonia to NOx=1.2, space velocity for the 3 inches total length of 80 000 h$^{-1}$, $C_{O2\text{-}Feed}$=10 wt.-%, $C_{H2O\text{-}Feed}$=5 wt.-%, $C_{CO2\text{-}Feed}$=5 wt. %). The NOx concentration was measured at different inlet temperatures (T=180° C. to 450° C.—FIG. 3/T=250 to 450° C.—FIG. 4) of the tested catalysts in function of time during urea dosing and after switch off of the urea dosing. The test was conducted on a lab reactor. The test was designed to simulate a sudden Temperature change in combination with no ammonia addition into the feed. Therefore, the NH$_3$ supply was switched-off at the same time when the temperature was increased. The catalyst now has to operate with the NH$_3$ stored at the time when the ammonia supply was switched-off and the dynamic behavior of the catalyst can be studied. The test shall mimic typical engine acceleration conditions, where the ammonia, or in this case urea, supply cannot adapted fast enough according to the dynamics of the engine exhaust composition and temperature change. The results are displayed in FIGS. 3 and 4.

As may be taken from FIG. 3, at t=4000 to 4121 seconds (inlet temperature of 180° C.), the NOx conversion of the catalyst of Example 4 is of about 16% while the NOx conversion of the catalyst of Comparative Example 1 is lower, namely of about 12%. Further, at t=4121 seconds, the NH$_3$ dosing was switched off and the temperature was increased, the NOx conversions of the two catalysts increased drastically from t=4121 to 4150 seconds up to about 93%. However, at t=about 4160 to 4400 seconds the NOx conversion of the catalyst of Comparative Example 1 decreases. In contrast thereto, for the catalyst according to the present invention (Example 4), the NOx conversion continued to increase from t=4150 to 4200 seconds to about 99% of NOx conversion. Afterwards, at t=4200 seconds, the NOx conversion of the inventive catalyst started to decrease while still being superior to the NOx conversion of the catalyst of Comparative Example 1.

As may be taken from FIG. 4, at t=13500 to 13821 seconds (inlet temperature of 250° C.), the NOx conversion of the catalyst of Example 4 is of about 91% while the NOx conversion of the catalyst of Comparative Example 1 is lower, namely of about 85%. Further, at t=13821 seconds, the NH$_3$ dosing was switched off and the temperature was increased, the NOx conversions of the two catalysts both increased from t=13821 to 13850 seconds, the NOx conversion of the catalyst of Example 4 still being superior to those of the catalyst of Comparative Example 1. However, at t=about 1360 to 14000 seconds, the NOx conversion of the catalyst of Comparative Example 1 decreases. In contrast thereto, for the catalyst according to the present invention (Example 4), at t=13850 seconds, the NOx conversion of the catalyst of Example 4 was of 100% and maintained from 100 to about 98% to t=about 13890 seconds. Afterwards, at t=about 13890 seconds, the NOx conversion of the inventive catalyst started to decrease while still being superior to the NOx conversion of the catalyst of Comparative Example 1.

Thus, FIGS. 3 and 4 illustrate that the catalyst according to the present invention permits to maintain for a longer period a great NOx conversion compared to the comparative catalyst not according to the present invention. Further, it is noted that it is believed to be due to the higher ammonia storage capacity in its upstream portion of the catalyst according to the present invention compared to the ammonia storage capacity in its downstream portion.

Reference Example 8: Preparation of a SCR Catalyst (Cu-CHA Containing)

The catalyst of Reference Example 8 was prepared as the catalyst of Reference Example 7, except that a different substrate was used. In particular, an uncoated honeycomb flow-through monolith cordierite substrate (diameter: 1 inch x length: 6 inches (2 juxtaposed substrates of 3 inches long—no gap between the substrates), cylindrically shaped with 600 cells per square inch and 3 mil wall thickness). The final loading of the coating in the catalyst after calcination is of about 2.75 g/in$^3$, including 2.62 g/in$^3$ of Cu-CHA, 0.13 g/in$^3$ of $ZrO_2$. The ammonia storage capacity of the coating measured according to Reference Example 1 was 1.9 mmol/g.

Example 6: A SCR Catalyst Comprising the Catalysts of Example 1 b) and of Reference Example 8

A SCR catalyst was prepared by combining the catalyst of Example 1 b) and the catalyst of Reference Example 8, in a manner that the catalyst of Example 1 b) is upstream of the catalyst of Reference Example 8 and the catalyst of Reference Example 8 is downstream of the catalyst of Example 1 b) and wherein there is no gap between the two catalysts. The formed catalyst had a length of 8 inches (2 inches—Example 1b)—and 6 inches—Reference Example 8).

Thus, the upstream portion of the catalyst of Example 6 made of the catalyst of Example 1 b) had an ammonia storage capacity of 2.8-3.0 mmol/g and the downstream portion of the catalyst of Example 4 made of the catalyst of Reference Example 8 had an ammonia storage capacity of 1.9 mmol/g, the ammonia storage capacity being determined as defined in Reference Example 1. The ammonia storage capacity in the upstream zone of the catalyst of Example 6 was higher than in the downstream zone of said catalyst.

Comparative Example 2: A SCR Catalyst Comprising the Catalysts of Reference Example 6 and of Reference Example 8

A SCR catalyst was prepared by combining the catalyst of Reference Example 6 and the catalyst of Reference Example 8, in a manner that the catalyst of Reference Example 6 is upstream of the catalyst of Reference Example 8 and the catalyst of Reference Example 7 is downstream of the catalyst of Reference Example 8 and wherein there is no gap between the two catalysts.

The formed catalyst had a length of 8 inches (2 inches—Reference Example 6—and 6 inches—Reference Example 8).

Thus, the upstream portion of the catalyst of Comparative Example 1 made of the catalyst of Reference Example 6 had an ammonia storage capacity of 1.2 mmol/g and the downstream portion of the catalyst of Comparative Example 1 made of the catalyst of Reference Example 8 had an ammonia storage capacity of 1.9 mmol/g, the ammonia storage capacity being determined as defined in Reference Example 1. The ammonia storage capacity in the downstream zone of the catalyst of Comparative Example 2 was higher than in the upstream zone of said catalyst. This example is representative of the prior art U.S. Pat. No. 9,597,636 B2, wherein it is disclosed that the ammonia storage capacity has to be higher in the downstream portion of the catalyst.

Example 7: Testing of the Catalysts of Example 6 and of Comparative Example 2—NOx Emissions A selective catalytic reduction (SCR) steady state was performed with ramps ($C_{NOx}=C_{NO}$(feed)=750 ppm, NSR (Normalized Stoichiometric Ratio) of ammonia to NOx=1.2, space velocity for the 8 inches total length of 30 000 h$^{-1}$, $C_{O2-Feed}$=10 wt.-%, $C_{H2O-Feed}$=5 wt.-%, $C_{CO2-Feed}$=5 wt. %). The NOx concentration was measured at different inlet temperatures (T=180° C. to 450° C.—FIG. 4) of the tested catalysts in function of time during urea dosing and after switch off of the urea dosing. The test was designed to simulate a sudden Temperature change in combination with no ammonia addition into the feed. Therefore, the NH3 supply was switched-off at the same time when the temperature was increased. The catalyst now has to operate with the NH3 stored at the time when the ammonia supply was switched-off and the dynamic behavior of the catalyst can be studied. The test shall mimic typical engine acceleration conditions, where the ammonia, or in this case urea, supply cannot adapted fast enough according to the dynamics of the engine exhaust composition and temperature change. The results are displayed in FIG. 5.

As may be taken from FIG. 5, at t=4000 to 4122 seconds (inlet temperature of 180° C.), the NOx conversion of the catalyst of Example 6 is of about 56% while the NOx conversion of the catalyst of Comparative Example 2 is lower, namely of about 43%. Further, at t=4122 seconds, the $NH_3$ dosing was switched off and the temperature was increased, the NOx conversions of the two catalysts increased drastically from t=4122 to 4170 seconds up to about 100%. However, at t=about 4300 to 4350 seconds the NOx conversion of the two catalysts decreases. However, for the catalyst according to the present invention (Example 6), the NOx conversion decreases in a slower manner compared to the NOx conversion of the catalyst of Comparative Example 2 and was thus still higher from t=4350 to 4550 seconds.

Thus, FIG. 5 illustrates that the catalyst according to the present invention permits to maintain for a longer period a great NOx conversion compared to the comparative catalyst not according to the present invention. Further, it is noted that it is believed to be due to the higher ammonia storage capacity in its upstream portion of the catalyst according to the present invention compared to the ammonia storage capacity in its downstream portion.

CITED LITERATURE

Figure 1:
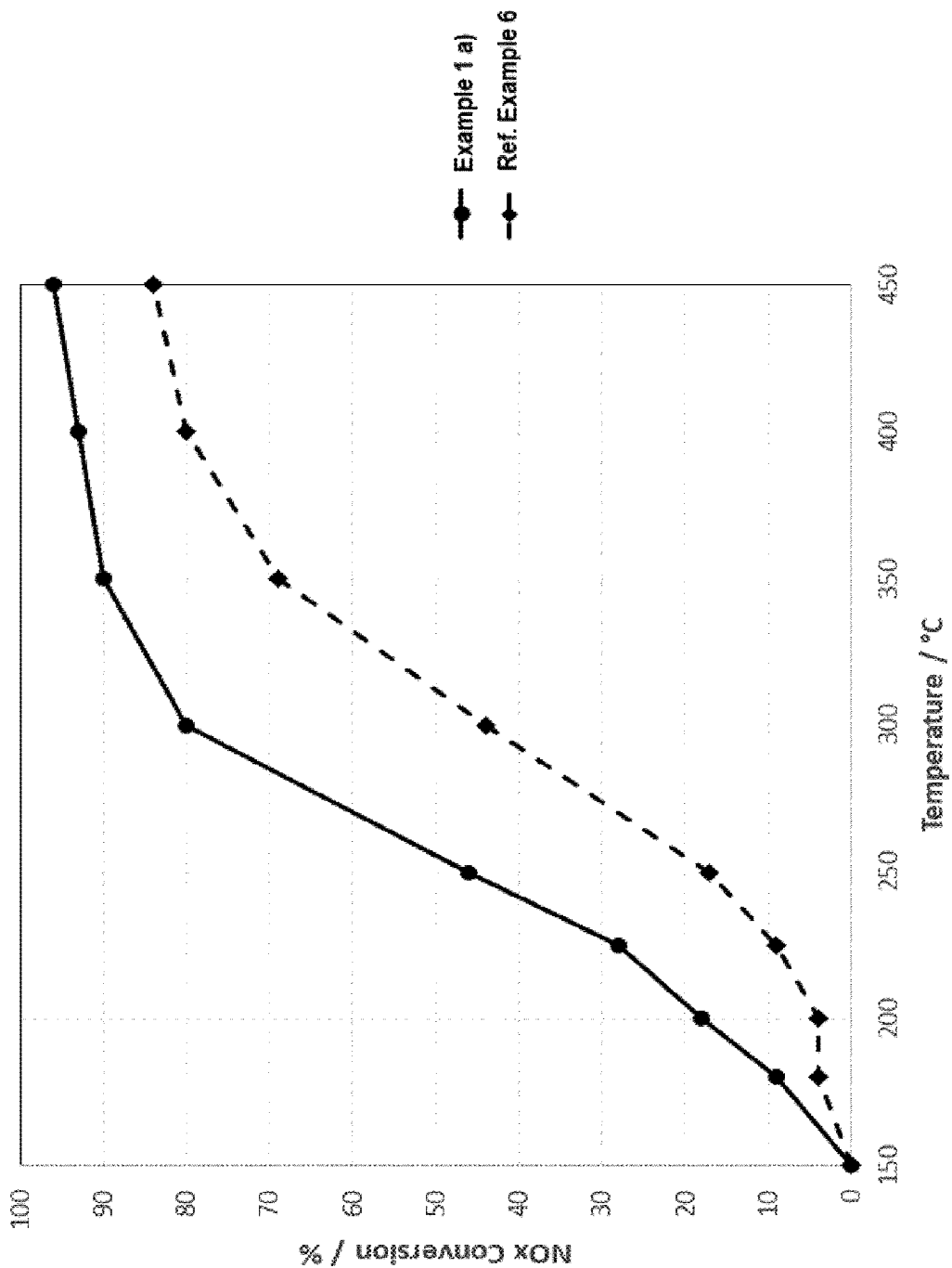
FIG. 1 shows the NOx conversion performance of the catalyst of Example 1 a) after ageing.
Figure 2:
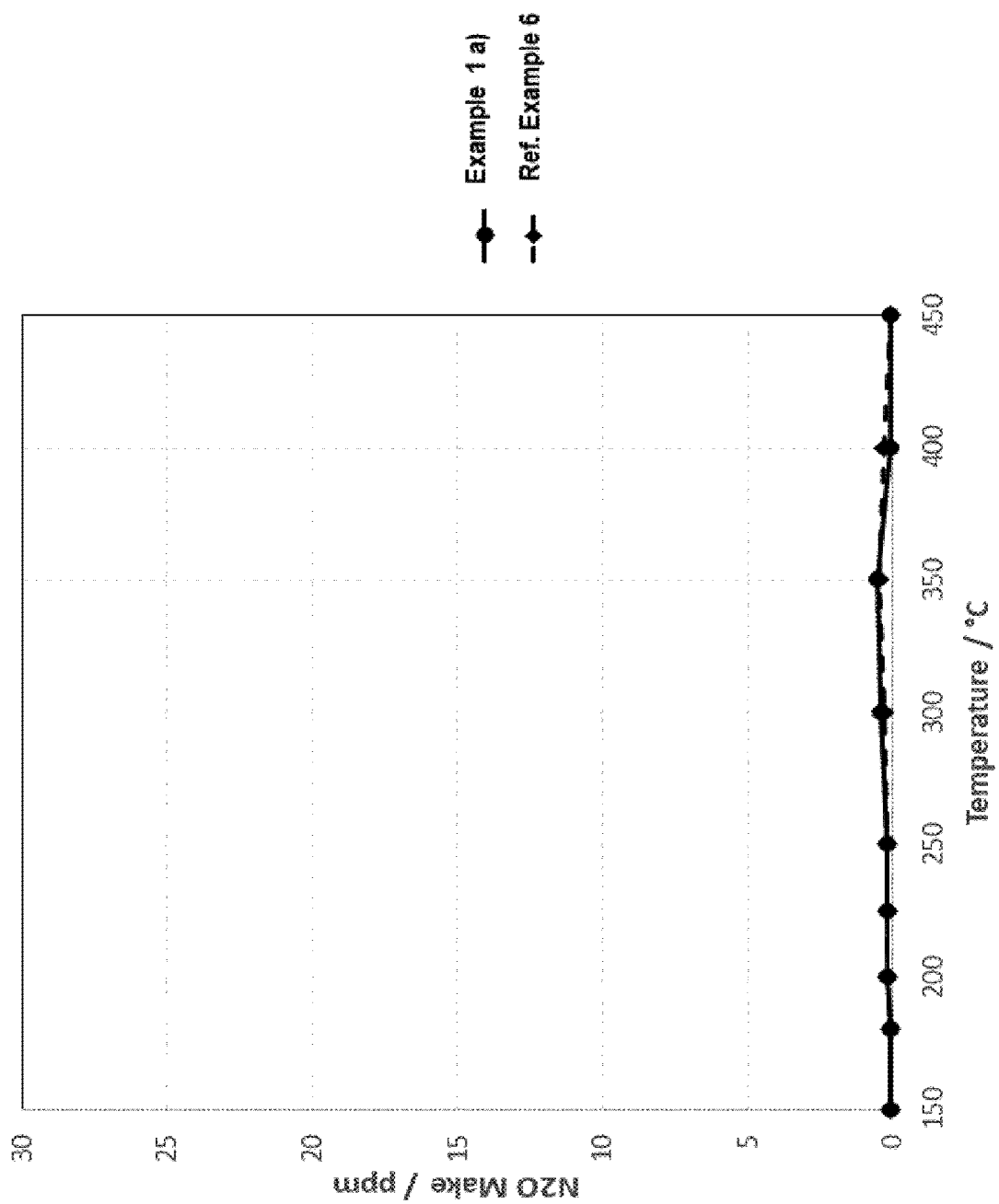
FIG. 2 shows the $N_2O$ formation obtained when using the catalyst of Example 1 a) after ageing.
Figure 3:
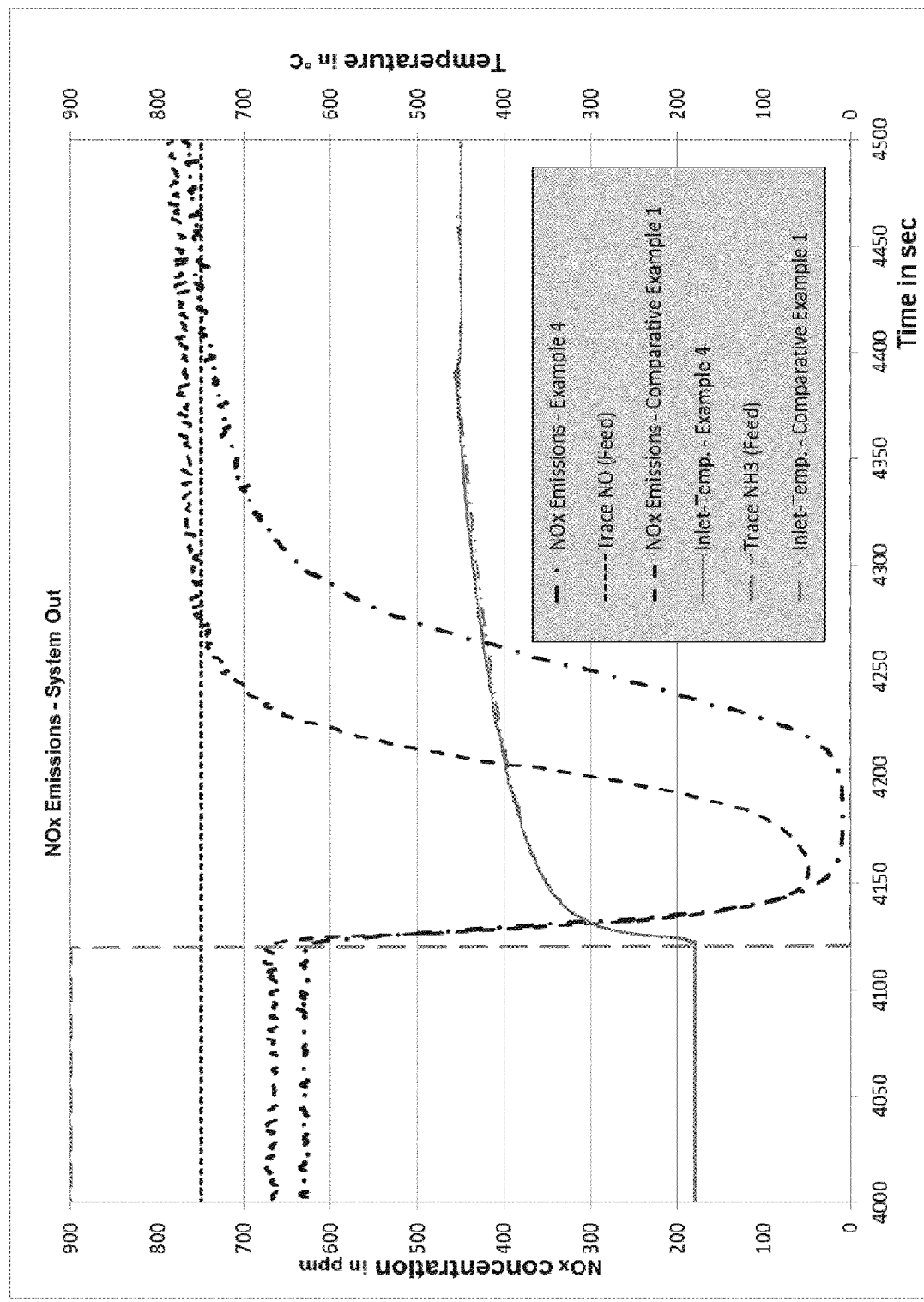
FIG. 3 shows the NOx emissions in function of time of the catalysts of Example 4 and Comparative Example 1 (ramp 180 to 450° C.).
Figure 4:
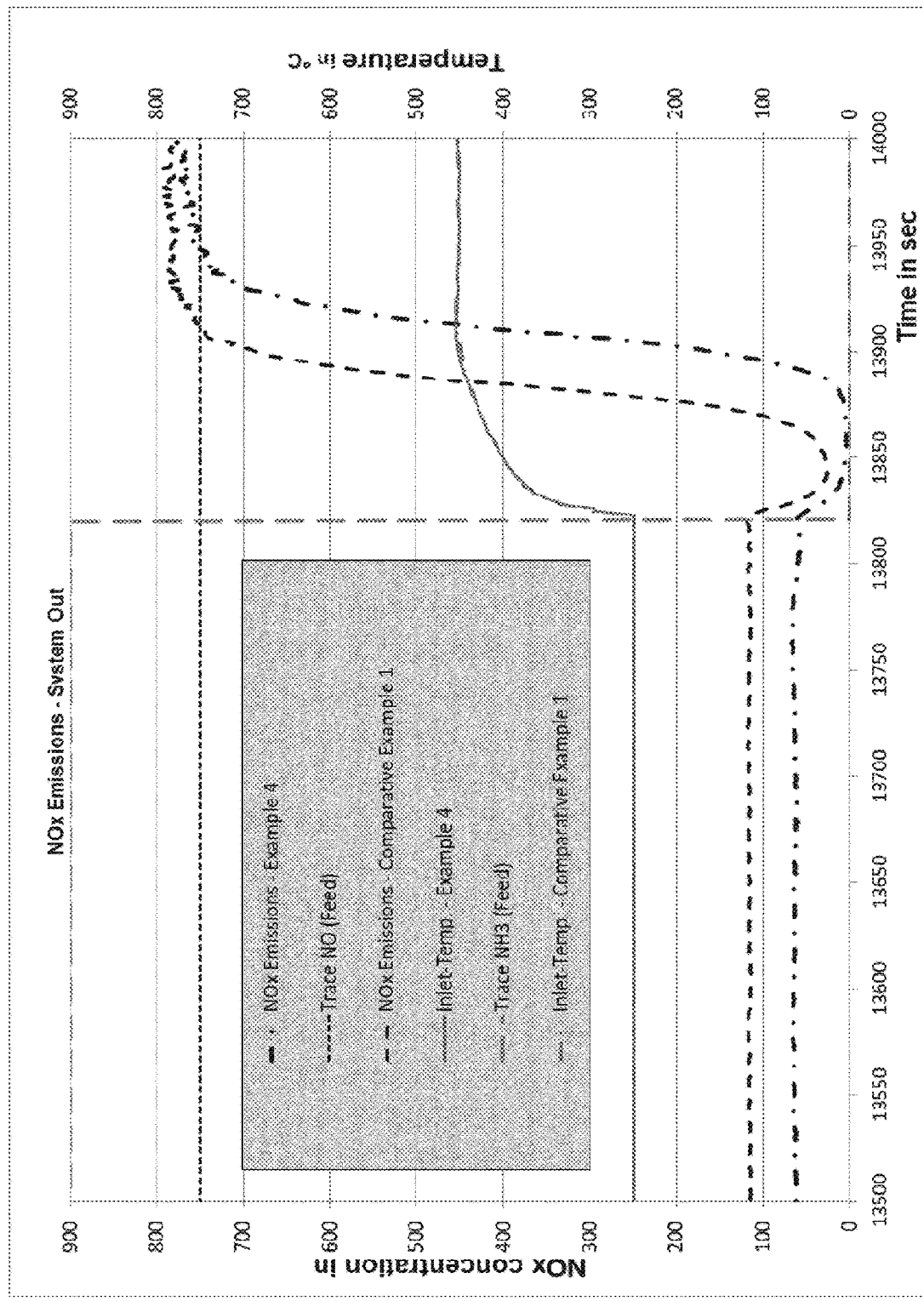
FIG. 4 shows the NOx emissions in function of time of the catalysts of Example 4 and Comparative Example 1 (ramp 250 to 450° C.).
Figure 5:
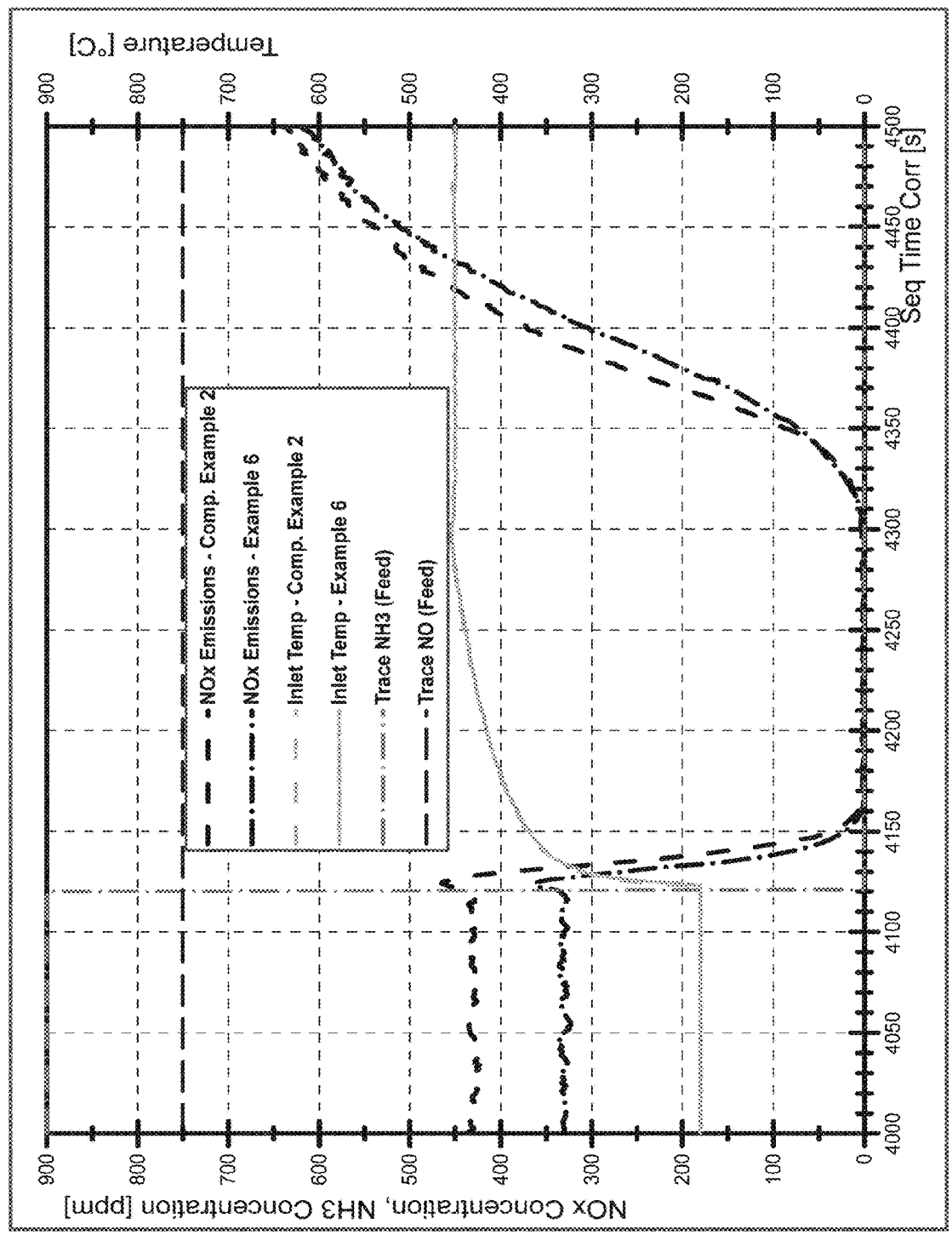
FIG. 5 shows the NOx emissions in function of time of the catalysts of Example 6 and Comparative Example 2 (ramp 180 to 450° C.).

U.S. Pat. No. 9,352,307 B2
EP 2 520 365 A2
U.S. Pat. No. 9,597,636 B2

The invention claimed is:

1. A catalyst for selective catalytic reduction of nitrogen oxide comprising:
(i) a substrate comprising an inlet end, an outlet end, a substrate axial length extending from the inlet end to the outlet end, and a plurality of passages defined by internal walls of the substrate extending therethrough;
(ii) a first coating comprising a 12-membered ring pore zeolitic material comprising a first metal which is one or more of copper and iron, wherein the 12-membered ring pore zeolitic material comprises the first metal in an amount of z1 weight-%, calculated as the weight of the first metal, calculated as CuO and $Fe_2O_3$, divided by the weight of the 12-membered ring pore zeolitic material comprising the first metal;
(iii) a second coating comprising an 8-membered ring pore zeolitic material comprising a second metal which is one or more of copper and iron, wherein the 8-membered ring pore zeolitic material comprises the second metal in an amount of z2 weight-%, calculated as the weight of the second metal, calculated as CuO and $Fe_2O_3$, divided by the weight of the 8-membered ring pore zeolitic material comprising the second metal;
wherein the first coating is disposed on the surface of the internal walls of the substrate, which surface defines the interface between the internal walls and the passages, and extends over x % of the substrate axial length from the inlet end toward the outlet end of the substrate, wherein x ranges from 10 to 75;
wherein the second coating extends over y % of the substrate axial length from the outlet end toward the inlet end of the substrate, wherein y ranges from 25 to 90;
wherein the ratio z1:z2 is in the range of from 0.5:1 to 0.95:1.

2. The catalyst of claim 1, wherein y is 100−x.

3. The catalyst of claim 1, wherein the 12-membered ring pore zeolitic material contained in the first coating has a framework type selected from the group consisting of BEA, FAU, USY, GME, MOR, OFF, a mixture of two or more thereof, and a mixed type of two or more thereof.

4. The catalyst of claim 1, wherein the 12-membered ring pore zeolitic material contained in the first coating comprises a first metal which is iron, wherein the 12-membered ring pore zeolitic material comprises iron in an amount of z1 weight-%, calculated as the weight of the first metal, calculated as $Fe_2O_3$, divided by the weight of the 12-membered ring pore zeolitic material comprising the first metal, and wherein z1 ranges of from 1.0 to 10.

5. The catalyst of claim 1, wherein the first coating further comprises a 10-membered ring pore zeolitic material comprising a third metal which is one or more of copper and iron; and
wherein the 10-membered ring pore zeolitic material contained in the first coating has a framework type selected from the group consisting of MFI, MWW, AEL, HEU, FER, AFO, a mixture of two or more thereof, and a mixed type of two or more thereof.

6. The catalyst of claim 1, wherein the first coating (ii) has an ammonia storage capacity $A1_{(NH3)}$ of at least 2.1 mmol/g, the ammonia storage capacity determined by Thermal Gravimetric Analysis.

7. The catalyst of claim 1, wherein the 8-membered ring pore zeolitic material contained in the second coating has a framework type selected from the group consisting of CHA, AEI, RTH, LEV, DDR, KFI, ERI, AFX, a mixture of two or more thereof, and a mixed type of two or more thereof.

8. The catalyst of claim 1, wherein the second coating (iii) has an ammonia storage capacity $A2_{(NH3)}$ of less than 2 mmol/g, the ammonia storage capacity determined by Thermal Gravimetric Analysis.

9. The catalyst of claim 1, wherein the first coating (ii) has an ammonia storage capacity $A1_{(NH3)}$ and the second coating (iii) has an ammonia storage capacity $A2_{(NH3)}$, wherein $A1_{(NH3)}$ is superior to $A2_{(NH3)}$, and the ammonia storage capacity determined by Thermal Gravimetric Analysis.

10. A process for preparing a catalyst for selective catalytic reduction of nitrogen oxide comprising:
(1) providing a substrate comprising an inlet end, an outlet end, a substrate axial length extending from the inlet end to the outlet end, and a plurality of passages defined by internal walls of the substrate extending therethrough;
(2) preparing a first mixture comprising water and a 12-membered ring pore zeolitic material comprising a first metal which is one or more of copper and iron, wherein the 12-membered ring pore zeolitic material comprises the first metal in an amount of z1 weight-%, calculated as the weight of the first metal, calculated as CuO and $Fe_2O_3$, divided by the weight of the 12-membered ring pore zeolitic material comprising the first metal;
(3) disposing the first mixture obtained in (2) on the surface of the internal walls of the substrate provided in (1), over x % of the substrate axial length from the inlet end toward the outlet end of the substrate, wherein x ranges from 10 to 75;
(4) drying the mixture-treated substrate obtained in (3), obtaining the substrate having a first coating disposed thereon; optionally calcining;
(5) preparing a second mixture comprising water and a 8-membered ring pore zeolitic material comprising a second metal which is one or more of copper and iron, wherein the 8-membered ring pore zeolitic material comprises the second metal in an amount of z2 weight-%, calculated as the weight of the second metal, calculated as CuO and $Fe_2O_3$, divided by the weight of the 8-membered ring pore zeolitic material comprising the second metal;
(6) disposing the second mixture obtained in (5) on the substrate having a first coating disposed thereon obtained in (4) over y % of the substrate axial length from the outlet end toward the inlet end of the substrate, wherein y ranges from 25 to 90;

(7) drying the mixture-treated substrate obtained in (6), obtaining the substrate having the first coating and a second coating disposed thereon; and
(8) calcining the substrate having the first coating and the second coating disposed thereon obtained in (7), obtaining the catalyst;
wherein the ratio z1:z2 ranges from 0.5:1 to 0.95:1.

11. The process of claim 10, wherein (2) further comprises:
(2.1) preparing a 12-membered ring pore zeolitic material;
(2.2) mixing a source of a first metal with the 12-membered ring pore zeolitic material obtained in (2.1);
(2.3) calcining the mixture obtained in (2.2), obtaining the 12-membered ring pore zeolitic material comprising the first metal;
(2.4) admixing water and the 12-membered ring pore zeolitic material comprising B the first metal.

12. An exhaust gas treatment system for treating an exhaust gas exiting from a combustion engine, wherein the system comprising one or more catalysts for the selective catalytic reduction of nitrogen oxide according to claim 1, and one or more of a diesel oxidation catalyst, a catalyzed soot filter, and an ammonia oxidation catalyst.

13. A catalyst for selective catalytic reduction of nitrogen oxide comprising:
a substrate comprising an inlet end, an outlet end, a substrate axial length extending from the inlet end to the outlet end, and a plurality of passages defined by internal walls of the substrate extending therethrough, and
a coating disposed on the surface of the internal walls of the substrate, which surface defines the interface between the internal walls and the passages,
wherein the coating comprising a 12-membered ring pore zeolitic material comprising a first metal which is one or more of copper and iron, and the 12-membered ring pore zeolitic material comprises the first metal in an amount of z weight-%, calculated as the weight of the first metal, calculated as CuO and $Fe_2O_3$, divided by the weight of the 12-membered ring pore zeolitic material comprising the first metal,
wherein the coating further comprises a 10-membered ring pore zeolitic material comprising a second metal which is one or more of copper and iron, wherein the 10-membered ring pore zeolitic material comprises the second metal in an amount of y weight-%, calculated as the weight of the second metal, calculated as CuO and $Fe_2O_3$, divided by the weight of the 10-membered ring pore zeolitic material comprising the second metal; and
wherein y ranges from 0.5 to 9 and y<z.

14. The catalyst of claim 13, wherein from 95 weight-% to 100 weight % of the framework structure of the 12-membered ring pore zeolitic material consist of Si, Al, O, and optionally H, wherein in the framework structure, the molar ratio of Si to Al, calculated as molar $SiO_2:Al_2O_3$, is ranges from 4:1 to 20:1.

15. The catalyst of claim 13, wherein the coating comprises the 10-membered ring pore zeolitic material comprising the second metal in an amount in the range of from 1 weight-% to 8 weight-%, based on the weight of the coating.

16. A catalyst for selective catalytic reduction of nitrogen oxide comprising:
a first catalyst for selective catalytic reduction of nitrogen oxide according to claim 13; and
a second catalyst for selective catalytic reduction of nitrogen oxide comprising:
a substrate comprising an inlet end, an outlet end, a substrate axial length extending from the inlet end to the outlet end, and a plurality of passages defined by internal walls of the flow through substrate extending therethrough;
a coating disposed on the surface of the internal walls of the substrate, wherein the coating comprises an 8-membered ring pore zeolitic material comprising a second metal which is one or more of copper and iron, wherein the 8-membered ring pore zeolitic material comprises the second metal in an amount of z2 weight %, calculated as the weight of the second metal, calculated as CuO and $Fe_2O_3$, divided by the weight of the 8-membered ring pore zeolitic material comprising the second metal, and wherein the second coating extends over y % of the substrate axial length from the outlet end toward the inlet end of the substrate, wherein y ranges from 25 to 90;
wherein the first catalyst is disposed upstream of the second catalyst, and
wherein there is less than 0.2 inch between the substrate of the first catalyst and the substrate of the second catalyst which are juxtaposed.

* * * * *